United States Patent
Kim et al.

(10) Patent No.: US 12,199,325 B2
(45) Date of Patent: Jan. 14, 2025

(54) ION-CONDUCTING LAYER WITH ION TRANSFER PATHS ALIGNED IN THE THICKNESS DIRECTION AND THE FABRICATION METHOD THEREOF

(71) Applicant: KOREA ADVANCED INSTITUTE OF SCIENCE AND TECHNOLOGY, Daejeon (KR)

(72) Inventors: Hee-Tak Kim, Daejeon (KR); Jonghyun Hyun, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 707 days.

(21) Appl. No.: 17/173,559

(22) Filed: Feb. 11, 2021

(65) Prior Publication Data

US 2021/0249675 A1 Aug. 12, 2021

(30) Foreign Application Priority Data

Feb. 12, 2020 (KR) ........................ 10-2020-0016794

(51) Int. Cl.
| | |
|---|---|
| *H01M 8/1041* | (2016.01) |
| *B01D 61/24* | (2006.01) |
| *B01D 61/42* | (2006.01) |
| *B01D 67/00* | (2006.01) |
| *B01D 69/12* | (2006.01) |
| *H01F 1/00* | (2006.01) |
| *H01M 8/103* | (2016.01) |

(Continued)

(52) U.S. Cl.
CPC ........ *H01M 8/1055* (2013.01); *B01D 61/243* (2013.01); *B01D 61/422* (2013.01); *B01D 67/00793* (2022.08); *B01D 69/12* (2013.01); *H01F 1/0045* (2013.01); *H01M 8/103* (2013.01); *H01M 8/1081* (2013.01); *H01M 8/1086* (2013.01); *H01M 2008/1095* (2013.01); *H01M 2300/0082* (2013.01); *H01M 2300/0094* (2013.01)

(58) Field of Classification Search
CPC .. H01M 8/1055; H01M 8/103; H01M 8/1081; H01M 8/1086; H01M 2008/1095; H01M 2300/0082; H01M 2300/0094; H01F 1/0045

See application file for complete search history.

(56) References Cited

FOREIGN PATENT DOCUMENTS

| CN | 110148770 | 8/2019 |
| JP | 2010238646 | 10/2010 |

(Continued)

OTHER PUBLICATIONS

Hyun et al., Jonghyun, "Magnetic Field-Induced Through-Plane Alignment of the Proton Highway in a Proton Exchange Membrane," ACS Applied Energy Materials, vol. 3, No. 5, May 26, 2020, pp. 4619-4628.

(Continued)

*Primary Examiner* — James Lee
(74) *Attorney, Agent, or Firm* — Hauptman Ham, LLP

(57) ABSTRACT

Provided is an ion-conducting layer including: an ion conductive matrix; and a 1D composite dispersed in the ion conductive matrix and oriented in a membrane thickness direction, in which the 1D composite includes a core of a non-conductive 1D nanostructure; an intermediate layer enclosing the core and having magnetic nanoparticles bonded to a surface thereof; and a surface layer conducting the same kind of ions as ions in the matrix.

12 Claims, 12 Drawing Sheets

(51) Int. Cl.
  *H01M 8/1081* (2016.01)
  *H01M 8/1086* (2016.01)
  *H01M 8/10* (2016.01)

(56) References Cited

FOREIGN PATENT DOCUMENTS

JP  5397375  1/2014
KR  20190002755  1/2019

OTHER PUBLICATIONS

Lin et al., Jia-Shuin, "Reorientation of Magnetic Graphene Oxide Nanosheets in Crosslinked Quaternized Polyvinyl Alcohol as Effective Solid Electrolyte," Energies, vol. 9, No. 12, Nov. 29, 2016, p. 1003.

Brijmohan et al., Smita B, "Magnetic ion-exchange nanoparticles and their application in proton exchange membranes," Journal of Membrane Science, vol. 303, No. 1-2, Sep. 4, 2007, pp. 64-71.

Hasanabadi et al., Noushin, "Nafion-based magnetically aligned nanocomposite proton exchange membranes for direct methanol fuel cells," Solid State Ionics, vol. 232, Feb. 1, 2013, pp. 58-67.

Extended European Search Report issued in corresponding European Application No. 21156662.5, dated Jul. 9, 2021, pp. 1-9, European Patent Office, Munich, Germany.

Abstracts Presented at the 60th KSIEC Meeting, The Korean Society of Industrial and Engineering Chemistry, 2019 KSIEC Fall Meeting, Oct. 30-Nov. 1, 2019, pp. 1-3.

Park et al., J.K., "Oriented Morphology and Anisotropic Transport in Uniaxially Stretched Perfluorosulfonate Ionomer Membranes," American Chemical Society, Macromolecules 2011, 44, 5701-5710.

Office Action dated Mar. 4, 2021 for corresponding case No. KR 10-2020-0016794. (pp. 1-7).

Notice of Allowance dated Jun. 25, 2021 for corresponding case No. KR 10-2020-0016794. (pp. 1-5).

ION-CONDUCTING LAYER WITH ION TRANSFER PATHS ALIGNED IN THE THICKNESS DIRECTION AND THE FABRICATION METHOD THEREOF

CROSS-REFERENCE TO RELATED APPLICATIONS

This application claims priority under 35 U.S.C. § 119 to Korean Patent Application No. 10-2020-0016794, filed on Feb. 12, 2020, in the Korean Intellectual Property Office, the disclosure of which is incorporated herein by reference in its entirety.

TECHNICAL FIELD

The following disclosure relates to an ion-conducting layer and a fabrication method thereof, and more particularly, to a polymer electrolyte-based ion-conducting layer with ion transfer paths aligned in a thickness direction using a magnetic field and a fabrication method thereof.

BACKGROUND

As the demand for electrochemical devices such as fuel cells, electrolytic cells, and flow cells increases, the use of a proton-conducting membrane (proton exchange membrane) has also increased. In the existing proton-conducting membrane, protons move through a channel of water clusters formed around some of ions of the polymer electrolyte. In the field of the proton-conducting membranes, the connection of the water channels or the increase in volume has been a major research direction for improving proton conductivity. To this end, technologies such as addition of polymer electrolytes with a new structure or hydrophobic additives have been proposed. However, as power performance of an electrochemical device is mainly determined by a membrane resistance in a thickness direction, it is very advantageous to align proton movement paths in the membrane thickness direction instead of simply connecting the water channels or increasing the volume to improve the power performance of the device.

Park et al. analyzed the anisotropic properties of stretched Nafion and proved that the proton conductivity was greatly improved in the alignment direction of the water channels. Similarly, Kusoglu et al. observed the shape of the compressed Nafion membrane using small angle X-ray scattering (SAXS) and proved the change in proton conduction. In connection with the increase in the proton conductivity, a method of physically modifying a Nafion membrane as a polymer electrolyte membrane has no disadvantages, and is a simple and good approach with no decrease in durability. However, as described above, in the actual electrochemical devices, an increase in ion conductivity in a thickness direction of an ion-conducting layer is required, but it is practically impossible to stretch the cast ion-conducting layer in the thickness direction.

RELATED ART DOCUMENT

Non-Patent Document

J. K. Park, J. Li, G. M. Divoux, L. A. Madsen, R. B. Moore, Macromolecules 2011, 44, 5701.

SUMMARY

An embodiment of the present invention is directed to providing an ion-conducting layer with improved ion conductivity in a membrane thickness direction.

Another embodiment of the present invention is directed to providing a fabrication method of an ion-conducting layer with improved ion conductivity in a membrane thickness direction by a simple and rapid process.

In one general aspect, an ion-conducting layer includes: an ion conductive matrix; and a 1D composite dispersed in the ion conductive matrix and oriented in a membrane thickness direction, in which the 1D composite includes: a core of a non-conductive 1D nanostructure; an intermediate layer enclosing the core and having magnetic nanoparticles bonded to a surface thereof; and a surface layer conducting the same kind of ions as ions in the matrix.

In another general aspect, an ion-conducting layer in which a 1D dispersion phase is oriented in a membrane thickness direction includes: an ion conductive matrix; and a 1D dispersion phase dispersed in the ion conductive matrix, in which the 1D dispersion phase is formed by aligning a 1D composite including a core of a non-conductive 1D nanostructure, an intermediate layer enclosing the core and having magnetic nanoparticles bonded to a surface thereof, and a surface layer conducting the same kind of ions as ions in the matrix in a membrane thickness direction by an external magnetic field and then removing magnetic nanoparticles bonded to the intermediate layer.

In still another general aspect, an ion-conducting layer includes: an ion conductive matrix; and a 1D dispersion phase dispersed in the ion conductive matrix and oriented in a membrane thickness direction, in which the 1D dispersion phase includes: a core of a non-conductive 1D nanostructure; and a surface layer conducting the same kind of ions as ions in the matrix.

The ion conductivity of the ion conductive matrix may be cationic conductivity, and the intermediate layer may include a cationic polymer.

The magnetic nanoparticles may have a negative zeta potential, and the magnetic nanoparticles may be fixed and bonded to the intermediate layer by an electrostatic attraction.

The 1D nanostructure may have a negative zeta potential, and each of the 1D nanostructure and the intermediate layer, and the intermediate layer and the surface layer may be bonded to each other through ionic interaction.

The 1D nanostructure may be selected from one or more nanowires, nanotubes, and nanorods.

A dispersion phase density, which is the number of 1D dispersion phases per unit area of the ion-conducting layer, may be 500 to 1,000,000 pcs/mm$^2$ based on a cross section perpendicular to an orientation direction of the 1D dispersion phase.

A thickness of the surface layer may be 1 to 100 nm.

The matrix or the surface layer may contain a sulfonated block copolymer, a perfluorinated polymer having a sulfonate group on a side chain, or a sulfonated aromatic polymer.

The ion conductivity of the surface layer may be greater than that of the matrix.

The cationic polymer may be one or more selected from poly(allylamine hydrochloride), poly(diallyldimethylammonium chloride), poly(acrylamide Co-diallyldimethylammonium chloride), polyethyleneimine, polymethacryloxyethyltrialkylammonium halide, polyarylaminechloride, polyacrylamide, aminoethylated polyacrylamide, polyvinylamine, and polyethyleneamine.

The surface layer may be a porous membrane (porous layer) having a through type pore.

The magnetic nanoparticles may be ferromagnetic nanoparticles.

The present invention includes a fabrication method of the ion-conducting layer described above.

A fabrication method of an ion-conducting layer includes: coating a composition containing an ion-conducting resin, a 1D composite, and a solvent to prepare a coated film; and drying the coated film, in which the 1D composite includes a core of a non-conductive 1D nanostructure; an intermediate layer enclosing the core and having magnetic nanoparticles bonded to a surface thereof; and a surface layer conducting the same kind of ions as ions in the ion-conducting resin, and a magnetic field is applied in a thickness direction of the coated film before drying of the coated film, simultaneously with the drying of the coated film, or during the drying of the coated film so that the 1D composite is oriented in the membrane thickness direction.

The fabrication method may further include: before the coating, preparing the 1D composite, in which the preparing of the 1D composite includes: a first step of forming the intermediate layer containing a cationic polymer in a 1D nanostructure; a second step of fixing magnetic nanoparticles having a negative zeta potential to a surface of an intermediate layer by an electrostatic attraction in a liquid medium; and a third step of forming a surface layer to the 1D nanostructure in which the magnetic nanoparticles are fixed and the intermediate layer is formed.

The ion-conducting resin may be a cationic conductive resin, and the 1D nanostructure has a negative zeta potential.

The solvent may be water, a glycol-based solvent, a glycol ether-based solvent, an alcohol-based solvent, a ketone-based solvent, an ester-based solvent, an amide-based solvent, a sulfoxide or sulfone-based solvent, a phenolic-based solvent, or a mixed solvent thereof.

The composition may contain 0.05 to 10 parts by weight of a 1D composite and 500 to 10000 parts by weight of a solvent based on 100 parts by weight of the ion-conducting resin.

The fabrication method may further include: activating the dried film obtained after the drying step by impregnating the dried film in an acidic aqueous solution.

The magnetic nanoparticles may be removed during the activating the dried film.

An intensity of the magnetic field may be 0.1 T to 100 T.

The magnetic nanoparticles may be ferromagnetic nanoparticles, and an intensity of the magnetic field may be 0.005 T to 0.1 T.

The present invention includes the ion-conducting layer fabricated by the above-described fabrication method.

BRIEF DESCRIPTION OF THE DRAWINGS

FIGS. 5A-5B are diagrams each illustrating STEM-EDS mapping of a region indicated by a square in pm-$WS_2$ of FIG. 4B, in which FIG. 5A illustrates a Fe mapping result and FIG. 5B illustrates an oxygen mapping result.

FIGS. 7A and 7B are diagrams illustrating measurement of FTIR spectrum of a prepared ion-conducting layer, in which FIG. 7A illustrates FTIR spectra of a Nafion membrane (Recast Nafion) to which nanowire is not added, 0.5 wt % of pms-$WS_2$/Nafion ion-conducting layer, 2 wt % of pms-$WS_2$/Nafion ion-conducting layer, and 5 wt % of pms-$WS_2$/Nafion ion-conducting layer, respectively, and FIG. 7B illustrates FTIR spectra of 2 wt % of pms-$WS_2$/Nafion ion-conducting layer and 2 wt % of pm-$WS_2$/Nafion ion-conducting layer, which is a Nafion membrane containing 2 wt % of pm $WS_2$ by mixing pm $WS_2$ instead of pms-$WS_2$ in Preparation Example.

DETAILED DESCRIPTION OF EMBODIMENTS

Figures 1A, 1B:
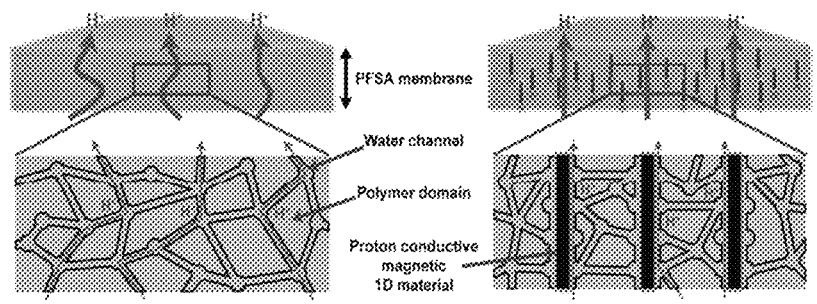
FIG. 1A is a schematic diagram illustrating an ion conduction mechanism of a conventional cation-conducting layer and FIG. 1B is a schematic diagram illustrating an ion conduction mechanism of an ion-conducting layer according to an exemplary embodiment of the present invention.

Hereinafter, the ion-conducting layer of the present invention will be described with reference to the accompanying drawings. Exemplary embodiments to be provided below are provided by way of example so that the spirit of the present invention may be sufficiently transferred to those skilled in the art. Therefore, the present invention is not limited to the accompanying drawings provided below, but may be modified in many different forms. In addition, the accompanying drawings suggested below will be exaggerated in order to clear the spirit and scope of the present invention. Technical terms and scientific terms used in the present specification have the general meaning understood by those skilled in the art to which the present invention pertains unless otherwise defined, and a description for the known function and configuration unnecessarily obscuring the gist of the present invention will be omitted in the following description and the accompanying drawings. In addition, a singular form used in the specification and the appended claims may be intended to include a plural form unless otherwise indicated in the context. In addition, in the present specification, the expression "include" is an open-type description having a meaning equivalent to expressions such as "include", "contain", "have", or "characterized", and is not elements, materials, or processes additionally listed. In addition, the expression "consisting substantially of . . . " means that other elements, materials, or processes not listed with specified elements, materials, or processes are present in an amount that does not have an unacceptably significant effect on at least one basic and novel technical idea of the invention. In the present specification and the appended claims, when a part such as a film (layer), a region, a component, etc., is above or on another part, this includes not only the case where a part is directly above in contact with another part, but also a case where another film (layer), another region, or another component is interposed therebetween. In the present specification and the appended claims, units used without special mention are based on weight, and as an example, a unit of % or ratio means wt % or weight ratio.

In the present invention, the ion-conducting layer may be collectively referred to as an ion exchange membrane or an ion exchange electrolyte membrane, and may mean a polymer-based membrane that has a fixed charge group and may selectively pass (migrate) only ions of opposite polarity. In the present invention, the ion-conducting layer may be a cation-conducting layer or an anion-conducting layer. As a non-limiting example, a cation may include a proton, and an anion may include a hydroxide ion. Unless otherwise specifically stated, when the ion-conducting layer is a cation-conducting layer, ions (including ions in a matrix), an ion-conducting resin, an ion-conducting material, and the like which are collectively referred to below may mean cation, a cation conductivity resin, a cation-conducting material, and the like that may be conducted through a membrane. In a specific example, the cation-conducting layer may be a proton (hydrogen ion)-conducting layer, and the cation may be a proton (hydrogen ion). Similarly, unless otherwise specifically stated, when the ion-conducting layer is an anion-conducting layer, ions (including ions in a matrix), an ion-conducting resin, an ion-conducting material, and the like which are collectively referred to below may mean anion, an anion-conducting resin, an anion-conducting material, and the like that may be conducted through a membrane.

According to an aspect, an ion-conducting layer includes: an ion conductive matrix; and a 1D dispersion phase dispersed in the ion conductive matrix and oriented in a membrane thickness direction, in which the 1D dispersion phase includes a core of a non-conductive 1D nanostructure; and a surface layer conducting the same kind of ions as ions in the matrix.

The ion conductive matrix may be a solid (including gel) medium in which the 1D dispersion phase is dispersed. The ion conductive matrix may contain an ion conductive polymer.

The 1D dispersion phase may mean a dispersion element having a 1D structure dispersed in the ion conductive matrix. The 1D dispersion phase may mean a dispersed state impregnated (buried) in the ion conductive matrix.

The 1D dispersion phase may include the core of the 1D nanostructure and the surface layer conducting the same kind of ions as the matrix. That is, when the matrix is a matrix having cationic conductivity, the surface layer may be a cation-conducting material, and when the matrix is a matrix having anion conductivity, the surface layer may be an anion-conducting material. At this time, the ion-conducting material may be an ion conductive polymer material. As the surface layer is an ion-conducting material that conducts the same kind of ions as the matrix, the 1D dispersion phase may also conduct ions.

In the 1D dispersion phase, the surface layer may mean a layer located at an outermost part of the 1D dispersion phase. As the 1D dispersion phase is dispersed in the ion conductive matrix, the 1D dispersion phase may directly contact the ion conductive matrix through the surface layer. Accordingly, the interface between the 1D dispersion phase and the ion conductive matrix may substantially be an interface between the surface layer and the ion conductive matrix.

The 1D nanostructure that gives the overall shape of the 1D dispersion phase may be a rigid 1D nanostructure that is free from bending (i.e., not flexible). When the 1D nanostructure has flexibility, it is practically impossible for the dispersion phases to be arranged in a certain direction. As the core is a rigid 1D nanostructure, the 1D dispersion phase may also have a linear 1D structure, and the surface layer may also have a macroscopically straight 1D structure. The microscopic surface layer has a hollow cross-section (cross-sectional shape) corresponding to the cross-section (cross-sectional shape) of the 1D nanostructure, and has a shape of a nanotube (hollow column) having a length corresponding to a length of the 1D nanostructure but may have a shape of a nanotube that extends straight without being bent in a longitudinal direction. In this case, it goes without saying that the thickness of the surface layer may correspond to a thickness of a tube wall in the nanotube shape.

That is, as the surface layer contains an ion-conducting material that conducts the same kind of ions as the matrix, the 1D dispersion phase may provide (and may have) an ion conduction path having a macroscopically straight 1D structure by the surface layer and may provide a 2D ion conductive path in the shape of the nanotube (hollow column) that microscopically extends straight without being bent in the longitudinal direction.

Experimentally, the rigid 1D nanostructure (or the 1D dispersion phase including the core of the rigid 1D nanostructure) may mean that the 1D dispersion phase in the ion-conducting layer is observed in a straight line on a microstructure observation image such as a scanning electron microscope observation image.

The 1D dispersion phase may be oriented in the thickness direction of the ion-conducting layer and may be impregnated and dispersed in the ion conductive matrix. In this case, as the 1D dispersion phase has a 1D structure, the orientation direction may be a direction from one end on a major axis of the 1D structure to the other end (major axis direction). Substantially all of the 1D dispersion phases contained in the ion-conducting layer may be oriented in the thickness direction of the ion-conducting layer. In this case, the fact that substantially all of the 1D dispersion phases have the same orientation direction is to prevent mathematically strict interpretation, and a deviation between the orientation directions of the 1D dispersion phase may not be mathematically zero. That is, although a distribution graph in the orientation direction of the 1D dispersion phase is narrow, the distribution graph is bound to be a Gaussian distribution graph having a variance exceeding 0. Accordingly, it is more reasonable that the same orientation direction is interpreted as a substantially the same direction rather than mathematically strictly the same direction. Experimentally, the maximum angular difference in the orientation direction of the 1D dispersion phases observed on the scanning electron microscope observation image of the ion-conducting layer having an observation area of 10 to 200

μm·10 to 200 μm is within 10·, substantially within 80·, and more substantially 5·, the 1D dispersion phases may be regarded as being arranged in the same direction.

The ion conductive matrix can conduct ions through a network-shaped 3D ion-conducting channel. While this network structure provides a lot of movement paths within a membrane, ions should pass through a fairly long and composite channel to move a certain distance in the membrane thickness direction.

The ion-conducting layer according to an exemplary embodiment includes an ion conductive matrix and a 1D dispersion phase including a surface layer having an ion conductive ability to conduct homogeneous ions, the ion conductive matrix and the surface layer form an interface by contacting each other, and as the 1D dispersion phase is oriented in the thickness direction of the ion-conducting layer, it is possible to remarkably improve the ion conductivity in the membrane thickness direction while smoothly moving a large amount of ions by the network-shaped 3D ion-conducting channel.

In detail, looking at the movement of ions through the ion-conducting layer, the ions moving through the matrix providing more ion conduction paths at the initial stage of movement may come into contact with the 1D dispersion phase during the movement process, and may move in the membrane thickness direction by the surface layer of the 1D dispersion phase. That is, as the ions collected in the 1D dispersion phase through the ion conductive matrix move in the major axis direction of the 1D dispersion phase through the surface layer of the 1D dispersion phase, the ion-conducting layer may have the significantly improved ion conductivity in the membrane thickness direction.

As a substantial example, the ion-conducting layer may satisfy Equation 1 below.

$$1.5 C_{ref} \leq C_{ICM} \quad \text{[Equation 1]}$$

In Equation 1, $C_{ICM}$ is the ion conductivity (mS/cm) in the membrane thickness direction of the ion-conducting layer according to one exemplary embodiment at a temperature of 80° C. and a relative humidity of 30%, and $C_{ref}$ is the ion conductivity (mS/cm) in a membrane thickness direction of an ion-conducting resin layer (reference membrane) contained under the same conditions, wherein a ion-conducting resin of the ion-conducting resin layer is the ion conductive matrix of the ion-conducting layer. The specific conditions for measuring the ion conductivity follow the ion conductivity measurement method in Examples to be described later.

According to an advantageous example, Equation 1 shows that the ion-conducting layer in which the 1D dispersion phase is oriented in the thickness direction has the ion conductivity (ion conductivity in the thickness direction) that has an improved ion conductivity of 50% or more than the ion conductivity (ion conductivity in the thickness direction) of the membrane (reference membrane) made of the ion-conducting resin contained in the matrix. As a practical example, the ion-conducting layer in which the 1D dispersion phase is oriented in the thickness direction may have an ion conductivity improved by 60% or more, and substantially 70% or more compared to the reference membrane. Accordingly, the ion-conducting layer can satisfy $1.6\,C_{ref} \leq C_{ICM}$, and more practically satisfy $1.7\,C_{ref} \leq C_{ICM}$.

According to one exemplary embodiment, the 1D structure of the 1D dispersion phase may be provided by the 1D nanostructure as the core. The 1D nanostructure may be one or more selected from one nanowire, nanotube and nanorod. However, it is more advantageous to be a nanowire having a larger aspect ratio and superior mechanical properties and mechanical stability.

The 1D nanostructure may be a non-conductive (insulating or semiconducting) material, and a rigid material, and considering the use of the ion-conducting layer, may be a material that is electrochemically stable in the environment where the membrane is exposed by the application. For example, the 1D nanostructure may be a ceramic, and the 1D ceramic nanostructure is metal oxide, metal carbide, metal nitride, metal oxynitride, metal carbonitride, metal chalcogenide, or a composite thereof (solid solution, intermetallic compounds, etc.), and the like. In this case, metals in the metal oxide, metal carbide, metal nitride, metal oxynitride, metal carbonitride, metal chalcogenide, etc., may be one or more selected from alkali metals, alkaline earth metals, transition metals, and post-transition metals, but is limited thereto.

However, as described later, like magnetic nanoparticles, the intermediate layer may stably enclose the 1D nanostructure by electrostatic interaction between the intermediate layer containing the cationic polymer and the 1D nanostructure. In order to increase a binding force between the intermediate layer and the 1D nanostructure, the 1D nanostructure is preferably a material having a negative surface charge (negative zeta potential). Examples of the 1D nanostructure having a negative zeta potential include, but not limited to, metal oxides and metal chalcogenides.

In this case, the non-conductive material may mean a material having band gap energy exceeding 0, specifically, band gap energy of 0.5 eV or more, 1.0 eV or more, 1.5 eV or more, 2.0 eV or 2.5 eV or more, but is not necessarily limited thereto. In this case, the band gap energy of the non-conductive material may be 6 eV or less or 5 eV or less.

According to one exemplary embodiment, the aspect ratio (major axis length/minor axis diameter) of the 1D nanostructure may be 5 to 500, and in specific examples, 10 to 500 or 10 to 100, but is not limited thereto. However, the 1D nanostructure having a large aspect ratio is advantageous because it may generate a stable ion conduction path across the membrane in the orientation direction even with a smaller 1D dispersion phase.

According to one exemplary embodiment, the major axis length of the 1D nanostructure may be 0.005 t to 0.500 t, specifically 0.010 t to 0.300 t, 0.010 t to 0.200 t, or 0.010 t to 0.100 t, based on t, which is the thickness of the ion-conducting layer, but is not necessarily limited thereto. At this time, the thickness of the ion-conducting layer should have a thickness suitable for the application in consideration of the application. In consideration of the conventional electrochemical device, the thickness of the ion-conducting layer may be in the range of 5 to 300 μm, and substantially 20 to 200 μm, but is not limited thereto.

According to one exemplary embodiment, the minor axis diameter of the 1D nanostructure may be a $10^1$ nm order to $10^2$ nm order level, specifically 10 nm to 900 nm, 50 nm to 500 nm, or 50 nm to 300 nm, but is not limited thereto. However, as the 1D nanostructure has a smaller minor axis diameter, it is advantageous because the 1D nanostructure may have a larger surface layer area based on the same 1D nanostructure content in the ion-conducting layer. However, since the 1D nanostructure is the rigid 1D nanostructure, it is more advantageous that a minor axis diameter is 10 nm or more, specifically 50 nm or more in order to stably prevent unwanted damage (cutting) of the 1D nanostructure during the process of fabricating the membrane.

According to one exemplary embodiment, the thickness of the surface layer may be 1 nm to 100 nm, but is not necessarily limited thereto.

According to one exemplary embodiment, the surface layer may be a continuum enclosing the 1D nanostructure. The surface layer as the continuum may mean a state in which the ion-conducting material contained in the surface layer is continuously connected at least in the longitudinal direction of the 2D nanostructure. Thus, the surface layer as the continuum may also include not only a simple membrane (dense membrane with no pores) of an ion-conducting material, but also a porous membrane of an ion-conducting material with through type pores, and furthermore, a porous membrane (network-shaped membrane) in which the ion-conducting material forms a 2D network structure.

According to one exemplary embodiment, when considering the 1D dispersion phase as a point present at the center point in the longitudinal direction (center of gravity of the 1D dispersion phase), the 1D dispersion phase may be randomly distributed in the ion conductive matrix.

According to one exemplary embodiment, in the ion-conducting layer, the dispersion phase density, which is the number of 1D dispersion phases per unit area of the ion-conducting layer, may be 500 to 1000000 pcs/mm$^2$, based on the cross section perpendicular to the thickness direction of the ion-conducting layer of the 1D dispersion phase, but is not limited thereto. However, if the density of the dispersion phase is excessively high, the content of the relative matrix in the ion-conducting layer decreases, so the ion conductivity may decrease, and if the density of the dispersion phase is excessively low, the number of linear ion conduction paths in a certain direction (orientation direction) decreases, so the ion conductivity may decrease. As a result, it is possible to have the dispersion phase density of the above-described appropriate range in consideration of the specific application of the ion-conducting layer.

According to one exemplary embodiment, the ion-conducting resin contained in the ion conductive matrix and the ion-conducting material contained in the surface layer of the 1D dispersion phase are different from each other, but a polymer material commonly used to selectively move ions in a conventional ion exchange membrane may be used. In this case, the weight average molecular weight of the polymer material may be in the range of 10000 to 5000000, but is not limited thereto.

An example of the polymer material commonly used to selectively move ions in the conventional ion exchange membrane may include a polymer, and the like having negatively charged ion exchange groups such as —$SO_3^-$, —$COO^-$, $PO_3^{2-}$, $PO_3H^-$, and $C_6H_4O^-$, when the ion-conducting layer is a cation-conducting layer, and typically a polymer containing a sulfonate group (—$SO_3^-$). When the ion-conducting layer is an anion-conducting layer, polymers having positively charged ion exchange groups, such as primary to quaternary ammonium groups, may be used, and a polymer containing a quaternary ammonium group, which is a strong base, is typically used.

As an example of a polymer containing a sulfonate group that is commonly used, a sulfonated block copolymer, a perfluorinated polymer having a sulfonate group on a side chain, a sulfonated aromatic polymer, or the like may be used. As an example of the sulfonated block copolymer, the sulfonated block copolymer is a sulfonated poly(styrene-b-ethylene-r-butylene-b-styrene) triblock copolymer, a poly-styrene poly(styrene-b-isobutylene-b-styrene) styrene), poly (norbornenylethylstyrene-s-styrene)-b-(n-propyl-p-styrenesulfonate), poly(t-butylstyrene-b-hydrogenated isoprene-b-sulfonated styrene-b-hydrogenated isoprene-b-t-butylstyrene) or a combination thereof, but is not limited thereto. The perfluorinated polymer having a sulfonate group on the side chain may include a fluorine-based resin having a sulfonate group at the end of the side chain with perfluoroalkylene as the main skeleton, and examples thereof may include a copolymer of tetrafluoroethylene and perfluoro (alkyl vinyl ether) and sulfonyl acid fluoride, a sulfonated polymer of α,β,β-trifluorostyrene, a combination thereof, or the like, but are not limited thereto. Examples of sulfonated aromatic polymers may include sulfonated polystyrene, sulfonated polysulfone, sulfonated polyethersulfone, sulfonated polyphenylsulfone, sulfonated 2,6-dimethyl polyphenylene oxide, sulfonated polyetherketone, sulfonated polyetherether ketone, sulfonated polyimide, sulfonated polyphenylsulfide, sulfonated polybenzimidazole, sulfonated poly(arylene ether ether nitrile), sulfonated poly(arylene ether sulfone), sulfonated poly(arylene ether benzonitrile), derivatives thereof, or combinations thereof, or the like. In the polymer containing the sulfonate group, the amount of sulfonate group may be 0.1 to 7.0 milliquivalents (meq)/g, but is not limited thereto.

However, the ion conductivity of the surface layer is better than that of the matrix. As a result, the ions reaching the surface layer of the 1D dispersion phase through the ion conductive matrix may not move from the surface layer to the ion conductive matrix again, but may continuously move through the surface layer.

That is, the ion conductive matrix (or the ion-conducting resin of the matrix) and the surface layer of the 1D dispersion phase (or the ion-conducting material contained in the surface layer) are different from each other, but the content (the number of ion exchange groups) of ion exchange groups per unit mass of the surface layer material may be greater than the content (the number of ion exchange groups) of ion exchange groups per unit mass of the matrix material.

Specifically, the amount (equivalent/g, hereinafter, IonEx1) of ion exchange groups contained in the ion-conducting material contained in the surface layer may be greater the amount (equivalent/g, or less, IonEx2) of ion exchange group contained in the ion-conducting resin contained in the ion conductive matrix, and substantially IonEx1/IonEX2 may be over 1.0 to 10.0, and more substantially 2.5 to 7.0. As a close example, when the ion conductive matrix and the surface layer are implemented using a polymer containing a sulfonate group as a representative cation-conducting material, the amount (IonEX2) of sulfonate groups of the ion-conducting resin contained in the ion conductive matrix is 0.1 to 2.0 milliquivalents/g, and the amount (IonEx1) of sulfonate groups of the ion-conducting material contained in the surface layer may be 5.0 to 7.0 milliquivalents/g.

In addition, advantageously, the ion-conducting resin contained in the ion conductive matrix may be a resin having an ion exchange group but a hydrophobic (non-polar, water-repellent) main skeleton. In this case, by spontaneous phase separation of the ion-conducting resin, the ion exchange group aggregates by self-assembly characteristics and forms a cluster domain, so the ion conductive matrix may have a 3D network type (network-shaped) ion-conducting channel. The network-shaped ion-conducting channel has a large number of contact points between the ion-conducting channel and the 1D dispersion phase while maintaining proper mechanical properties and a degree of swelling when activating or utilizing the ion-conducting layer, and thus is advantageous for supplying ions conducted through the matrix to be supplied to the 1D dispersion phase.

Representative examples of the cationic conductive resin capable of forming a 3D network type (network-shaped) ion-conducting channel in an ion conductive matrix may include a perfluorinated polymer having a sulfonate group on a side chain, especially a polymer having perfluoroalkylene as main skeleton and a sulfonate group on a side chain. These substances are also sold as commercial products, such as Nafion (Dupont), Dow (Dow Chemical), Aciplex (Asahi Kasei High School), and Flemion (Asahi Glass) which have been known well. In addition, a representative example of the surface layer having the content of the ion exchange group per unit mass greater than the content of the ion exchange group per unit mass of the matrix may include a sulfonated aromatic polymer, but may not be limited to a type of detailed material that satisfies the above-described conditions of the present invention.

According to one exemplary embodiment, the ion conductive matrix may further include additives known to be used to improve mechanical properties or dimensional stability in the conventional ion exchange membrane, together with an ion-conducting resin. Examples of such additives include hydrophilic fibers such as cellulose nanofibers or polyvinyl alcohol, radical scavengers such as cerium oxide and alumina, metal nanoparticles such as platinum, palladium, and cobalt. However, the present invention is not limited to the specific types of additives contained in the ion conductive matrix.

According to one exemplary embodiment, the 1D dispersion phase may further include an intermediate layer positioned between the core and the surface layer and including a cationic polymer. The cationic polymer imparts a positive surface potential to the 1D nanostructure, allowing magnetic nanoparticles to be fixed to the 1D nanostructure by electrostatic attraction. Furthermore, when the ion-conducting layer is a cation-conducting layer, the surface layer may be formed by the ionic interaction between the intermediate layer containing the cationic polymer and the ion-conducting material of the surface layer, and the surface layer that does not cover the magnetic nanoparticles may be formed by the intermediate layer.

In detail, the magnetic nanoparticles may have a negative zeta potential, and the magnetic nanoparticles may be fixed and bonded to the intermediate layer by the electrostatic attraction. In addition, as the magnetic nanoparticles have a negative zeta potential, due to electrostatic repulsion between the material of the surface layer having cationic conductivity and the magnetic nanoparticles, the surface layer selectively covering the exposed intermediate layer exposed by the non-bonding of the magnetic particle nanoparticles may be formed.

As the surface layer does not cover the magnetic nanoparticles and has a structure in which the nanoparticles penetrate, the magnetic nanoparticles may be removed by the activation of the ion-conducting layer after oriented in the thickness direction by application of an external magnetic field as described below. Accordingly, the ion-conducting layer according to an exemplary embodiment includes not only the ion-conducting layer containing the magnetic nanoparticles, but also the ion-conducting layer from which the magnetic nanoparticles are removed. In the ion-conducting layer from which the magnetic nanoparticles are removed, the 1D dispersion phase may include a core of a non-conductive 1D nanostructure; a cationic conductive surface layer; and an intermediate layer positioned between the core and the surface layer and containing the cationic polymer, and the surface layer may be a porous membrane having a through type pore.

In addition, when the 1D nanostructure has a negative zeta potential, each of the 1D nanostructure and the intermediate layer and the intermediate layer and the surface layer may be bonded to each other through the ionic interaction.

In an advantageous example, the ion-conducting layer may be a cation-conducting layer, and the 1D nanostructure and the magnetic nanoparticles may each have a negative zeta potential. Specific examples of the 1D nanostructure having the negative zeta potential include metal oxides, metal chalcogenides, or the like, and the magnetic nanoparticles having the negative zeta potential may include oxide-based magnetic nanoparticles.

Examples of the cationic polymer of the intermediate layer may include, but not limited to, poly(allylamine hydrochloride), poly(diallyldimethylammonium chloride), poly(acrylamide Co-diallyldimethylammonium chloride), polyethyleneimine, polymethacryloxyethyltrialkylammonium halide, polyarylaminechloride, polyacrylamide, aminoethylated polyacrylamide, polyvinylamine, polyethyleneamine, and the like.

The intermediate layer containing the cationic polymer may have a thickness that may stably enclose the 1D nanostructure. As a specific example, the thickness of the intermediate layer may be about 1 to 100 nm or 3 to 100 nm, but is not limited thereto.

As described above, the 1D dispersion phase is positioned between the core and the surface layer and may further include the intermediate layer including the cationic polymer, and may further include magnetic nanoparticles bonded to the surface of the intermediate layer. The magnetic nanoparticles provide magnetism to the 1D dispersion phase, so that the 1D dispersion phase may be aligned in the direction of application of the magnetic field by an external magnetic field in a fabrication method described later.

According to one exemplary embodiment, the magnetic nanoparticles may be paramagnetic nanoparticles, ferrimagnetic nanoparticles, or ferromagnetic nanoparticles. The case where the magnetic nanoparticles are ferromagnetic nanoparticles is advantageous because the 1D dispersion phases may be aligned in the membrane thickness direction by application of an external magnetic field with a small intensity of about 0.005 T to 0.1 T.

In the fabrication process of the ion-conducting layer, the magnetic nanoparticles are preferably oxides having a negative zeta potential in terms of being stably bonded to and uniformly dispersed and bonded to the intermediate layer containing the protic polymer under the liquid medium by the electrostatic attraction.

Examples of oxide-based magnetic nanoparticles having a negative zeta potential according to an advantageous example may include, but not limited to, iron oxide nanoparticles, manganese oxide nanoparticles, gadolinium oxide nanoparticles, erbium oxide nanoparticles, chromium oxide nanoparticles, nickel oxide nanoparticles, a combination thereof, or the like.

A diameter ($D_{np}$) of the magnetic nanoparticles is 0.01 $D_{1d}$ to 0.30 $D_{1d}$, specifically 0.01 $D_{1d}$ to 0.20 $D_{1d}$, more specifically 0.05 $D_{1d}$ to 0.15 $D_{1d}$ based on a diameter ($D_{1d}$) of the nanostructure so that the magnetic nanoparticles are bonded through the intermediate layer to impart uniform magnetism to the 1D nanostructure, but is not limited thereto.

A content of the magnetic nanoparticles in the 1D dispersion phase is sufficient as long as the content may exhibit magnetism such that the 1D dispersion phases may be aligned in the direction of the application of the external magnetic field when the external magnetic field is applied to a coated film coated with a solution containing an ion-conducting resin and a 1D dispersion phase. As an example, the 1D dispersion phase may contain 1 to 20 parts by weight of magnetic nanoparticles based on 100 parts by weight of the 1D nanostructure, but is not limited thereto.

According to one exemplary embodiment, the shape and size of the ion-conducting layer may be determined by the ion conductive matrix. That is, the shape of the ion-conducting layer may correspond to the shape of the ion conductive matrix, and the size of the ion-conducting layer may correspond to the size of the ion conductive matrix. The shape and size of the ion-conducting layer may be appropriately adjusted taking into account the specific application and the scale of the device in which the membrane is provided. However, the thickness of the ion-conducting layer may be in the range of 5 to 300 μm, and substantially 20 to 200 μm, but is not limited thereto.

When the ion-conducting layer according to an exemplary embodiment of the present invention is described in detail in terms of the ion-conducting channel, the ion-conducting layer includes a network-shaped 3D ion-conducting channel; and an ion-conducting channel in a thickness direction in contact with the 3D ion-conducting channel, oriented in the thickness direction of the ion-conducting layer, and connecting both ends of the 1D nanostructure through the surface layer on the 1D nanostructure.

As described above, the network-shaped 3D ion-conducting channel can be provided by the ion conductive matrix. In addition, the ion-conducting channel in the thickness direction may be provided by the surface layer of the 1D nanostructure.

FIG. 1A is a schematic diagram showing a conduction mechanism of cations (e.g., protons) through a network-shaped 3D ion-conducting channel formed by a cationic conductive resin, and FIG. 1B is a schematic diagram showing a cation conduction mechanism of an ion-conducting layer including an ion-conducting channel in a thickness direction according to an exemplary embodiment of the present invention. The upper portion in FIGS. 1A and 1B illustrates the macroscopic membrane morphology and the macroscopic cation conduction path (arrow), and the lower portion in FIGS. 1A and 1B illustrates the conduction of ions (arrow) through the ion-conducting channel. As in an example illustrated in FIG. 1A, the conventional ion-conducting layer having the 3D network-shaped ion-conducting channel allows the conduction of ions in the membrane thickness direction through a composite and long path of the membrane. However, as in an example illustrated in FIG. 1B, the ion-conducting layer according to the exemplary embodiment of the present invention conducts ions through the surface layer (proton-conducting magnetic 1D material in FIG. 1B) of the 1D nanostructure vertically oriented to the membrane, and as a result, linear ion conduction, which is the shortest distance, is possible through such the ion conduction channel in the thickness direction.

The ion-conducting layer described above may be an ion-conducting layer activated by hydration or the like.

The ion-conducting layer described above may be a deactivated ion-conducting layer or activated ion-conductive layer.

The present invention includes an ion-conducting composite.

According to the present invention, the ion-conducting composite includes: an ion conductive matrix; and a 1D composite dispersed in the ion conductive matrix and oriented in a membrane thickness direction, in which the 1D composite includes a core of a non-conductive 1D nanostructure; an intermediate layer enclosing the core and having magnetic nanoparticles coupled to a surface thereof; and a surface layer conducting the same kind of ions as ions in the matrix.

The ion-conducting composite may correspond to the ion-conducting layer containing the magnetic nanoparticles, and the 1D composite may correspond to a 1D dispersion phase (1D dispersion element) containing magnetic nanoparticles. The ion-conducting composite may correspond to the state in which the ion-conducting channel is not activated by hydration or the like, that is, to the ion-conducting layer in the deactivated state.

The ion-conducting composite according to the present invention may be converted into the activated ion-conducting layer described above by activation. The activated ion-conducting layer may correspond to the ion-conducting layer from which the magnetic nanoparticles are removed. In specific example, the ion-conducting layer from which the magnetic nanoparticles are removed includes an ion conductive matrix; and a 1D dispersion phase dispersed in the ion conductive matrix, in which the 1D dispersion phase may be formed by aligning the 1D composite including a core of a non-conductive 1D nanostructure, an intermediate layer enclosing the core and having magnetic nanoparticles bonded to the surface thereof, and a surface layer that conducts the same kind of ions as the ions in the matrix in the membrane thickness direction by the external magnetic field and then removing the magnetic nanoparticles bonded to the intermediate layer.

According to one exemplary embodiment, the 1D composite may include 1D nanostructure; an intermediate layer containing a cationic polymer coated on a 1D nanostructure; magnetic nanoparticles bonded to the intermediate layer by electrostatic attraction; and a surface layer that covers the intermediate layer exposed to the surface due to the non-bonding magnetic nanoparticles with ion-conducting material and contains the ion-conducting material conducting the same kind of ions as the ions in the matrix. In this case, the magnetic nanoparticles may have a structure penetrating through the surface layer. When the ion-conducting composite is a cation-conducting composite, the magnetic nanoparticles having the negative zeta potential may be bonded to the intermediate layer, which indicates the positive zeta potential by the cationic polymer, by the electrostatic attraction. Thus, the ion-conducting material containing the ion exchange group having negative charges, such as a sulfonate group, magnetic nanoparticles may selectively cover the exposed surface of the intermediate layer indicating the positive charges due to the non-bonding magnetic nanoparticles by the electrostatic repulsion with the magnetic nanoparticles having the same kind of charge, thereby forming the structure in which the magnetic nanoparticles penetrate through the surface layer.

In the ion-conducting composite, the ion conductive matrix, the orientation in the 1D composite oriented in a certain direction, the 1D nanostructure, the intermediate layer, the cationic polymer of the intermediate layer, the magnetic nanoparticles, the surface layer, and the ion-conducting material of the surface layer are similar to or the same as the ion-conducting materials, the orientation, the 1D nanostructure, the intermediate layer, the cationic polymer, the magnetic nanoparticles, the surface layer, and the ion-conducting material of the surface layer which are described above in the ion-conducting layer.

The present invention includes a method of activating an ion-conducting composite described above.

The activation method according to the present invention includes a step of impregnating the above-described ion-conducting composite in an aqueous solution (activation solution) containing ions having the same kind of charge as ions conducted through the ion conductive matrix.

For example, when the composite is a cation-conducting composite, the aqueous solution may be an aqueous solution containing hydrogen ions, that is, an acidic aqueous solution. As another example, when the composite is an anion-conducting composite, the aqueous solution may be an aqueous solution containing hydroxide ions, that is, a basic aqueous solution.

As a representative activation solution based on the cation-conducting composite, the activation solution may be a strong acid aqueous solution, and may be a strong acid aqueous solution including sulfuric acid, hydrochloric acid, nitric acid, a mixed acid thereof, and the like. The acid concentration in the strong acid aqueous solution may be about 1 M to 3 M, but the present invention may not be limited to the specific type or concentration of the activation solution used for activation. Accordingly, the activation may be performed using any method or material known to be used to activate the conventional cation exchange membrane or anion exchange membrane. For example, instead of impregnating in the activation solution, the activation may be performed through bubbling, droplet spraying, or the like, and the activation may be performed through an ionic liquid at room temperature instead of an aqueous solution. However, when the activation is performed by impregnating the ion-conducting composite in the activation solution, the magnetic nanoparticles are removed as soon as the ion-conducting channel, e.g., a moisture channel is formed in the composite, and the composite may be converted into the ion-conducting layer (ion-conducting layer from which the magnetic nanoparticles are removed). When activated, the magnetic nanoparticles are removed, and during the use of the ion-conducting layer such as the driving of a fuel cell, adverse effects, such as a generation of radicals with strong activity by the magnetic nanoparticles, poisoning of a catalyst by the generated radicals, and a decomposition of the ion exchange polymers, may be prevented.

The present invention includes the fabrication method of the ion-conducting layer described above. In this case, as the ion-conducting layer containing the magnetic nanoparticles is fabricated and the ion-conducting layer containing no magnetic nanoparticles is fabricated by the activation, the fabrication method of the ion-conducting layer includes a fabrication method of an ion-conducting composite.

According to the present invention, a fabrication method of an ion-conducting layer includes: a step of coating a composition containing an ion-conducting resin, a 1D composite, and a solvent to prepare a coated film; and a step of drying the coated film, in which the 1D composite includes a core of a non-conductive 1D nanostructure; an intermediate layer enclosing the core and having magnetic nanoparticles bonded to a surface thereof; and a surface layer conducting the same kind of ions as ions in the ion-conducting resin, and a magnetic field is applied in a thickness direction of the coated film before drying of the coated film, simultaneously with the drying of the coated film, or during the drying of the coated film so that the 1D composite is oriented in the thickness direction of the coated film.

In this case, the 1D composite may correspond to the 1D dispersion phase including the magnetic nanoparticles in the ion-conducting layer described above In addition, the ion-conducting resin may correspond to the ion-conducting resin contained in the ion conductive matrix in the ion-conducting layer described above.

In the coating step, any coating method known to be used to prepare a membrane by coating a liquid or dispersion phase (suspension, etc.) may be generally used when the composition is coated. For example, the coating may be performed using inkjet printing, slot die coating, gravure printing, flexography printing, doctor blade coating, screen printing, electrostatic hydraulic printing, micro contact printing, imprinting, reverse offset printing, bar-coating, gravure offset printing, roll coating, and the like, but is not limited thereto.

The composition may contain 0.05 to 10 parts by weight of 1D composite and 500 to 10000 parts by weight of solvent based on 100 parts by weight of ion-conducting resin, but is not limited thereto. Therefore, in consideration of the density of the 1D dispersion phase in the desired ion-conducting layer, the content in the composition may be appropriately adjusted.

The solvent may be a polar proton solvent, a non-polar solvent, or a mixed solvent thereof, and examples of the solvent may include water, a glycol-based solvent, a glycol ether-based solvent, an alcohol-based solvent, a ketone-based solvent, an ester-based solvent, an amide-based solvent, a sulfoxide or sulfone-based solvent, a phenolic solvent, or a mixed solvent thereof. In this case, the glycol-based solvent may include ethylene glycol, propylene glycol, butylene glycol, triethylene glycol, hexylene glycol, polyethylene glycol, ethoxydiglycol, dipropylene glycol, a combination thereof, or the like, the glycol ether-based solvent may include methyl glycol ether, ethyl glycol ether, isopropyl glycol ether, a combination thereof, or the like, the alcohol-based solvent may include methanol, ethanol, n-propanol, isopropanol, butanol, a combination thereof, or the like, the ketone-based solvent may include acetone, methyl ethyl ketone, methyl isobutyl ketone, a combination thereof, or the like, the ester-based solvent may include ethyl acetate, butyl acetate, diethylene glycol ether acetate, methoxypropyl acetate, ethylene carbonate, propylene carbonate, a combination thereof, or the like, the amide solvent may include dimethylformamide, dimethylacetamide, dimethylcaprylic/capric fatty acid amide, N-alkylpyrrolidone, a combination thereof, or the like, the sulfoxide or sulfone-based solvent may include dimethyl sulfoxide (DMSO), sulfolane, or the like, and the phenolic solvent may include toluene or xylene, but is not limited thereto.

The composition may be a composition in which an ion-conducting resin is dissolved in a solvent and a 1D composite is dispersed, or may be a composition in which an ion-conducting resin is suspended in a solvent and a 1D composite is dispersed.

As described above, after coating the composition to prepare the coated film, the step of applying of the magnetic field in the thickness direction of the coated film may be performed. The 1D composite in the coated film may be oriented in the membrane thickness direction by the magnetic field applied to the coated film. The intensity of the applied magnetic field may by about 0.005 T to 100 T, specifically 0.1 T to 100 T. When the magnetic nanoparticles are ferromagnetic nanoparticles, a magnetic field having an intensity of 0.005 T to 0.1 T may be applied.

The timing when the magnetic field is applied to the coated film may be before the drying of the coated film, simultaneously with the drying of the coated film, or during the drying of the coated film. The timing when the magnetic field is applied to the coated film may be a timing when the movement of the 1D composite is suppressed while the 1D composite contained in the coated film may rotate and may be aligned in the application direction of the magnetic field.

The time (the timing when the magnetic field is applied) is related to the intensity of the magnetic field and the viscosity of the composition or coated film. When a magnetic field with constant intensity is applied, the viscosity of the composition is so high that the 1D composite may rotate but may be difficult to move, the magnetic field may be applied before the drying or simultaneously with the drying. In addition, when the viscosity of the composition is low in order to have the coating suitability according to the specific application method and thus there is a risk of the movement of the 1D composite due to the magnetic field at the time of forming the coated film, the magnetic field may be applied while the drying is in progress. As the drying progresses, the solvent in the coated film is volatilized and removed, and as the viscosity of the coated film increases, it is possible to prevent the 2D composite from moving from its original position to the application direction of the magnetic field while the 1D composite rotates and is aligned in the application direction of the magnetic field by controlling the timing when the magnetic field is applied during the drying.

In terms of satisfying the above-described coating suitability and controlling the viscosity of the coated film to an appropriate level at the time of the application of the magnetic field, the composition may include a first solvent having a first boiling point and a second solvent having a second boiling point lower than the first boiling point, on the basis of 1 atm of solvent. At this time, the first and second solvents may be selected from water, a glycol-based solvent, a glycol ether-based solvent, an alcohol-based solvent, a ketone-based solvent, an ester-based solvent, an amide-based solvent, a sulfoxide or sulfone-based solvent, and a phenolic solvent.

When the composition contains the first solvent and the second solvent, the second solvent contained in the coated film during the drying of the coated film is volatilized and removed faster than the first solvent, and the viscosity of the coated film may be increased, and as the first solvent is volatilized and removed relatively slower, the viscosity increased by the removal of the second solvent may be stably maintained for a certain time. Accordingly, the fluidity of the 1D composite in the coated film at the time of the application of the magnetic field may be controlled by the mixing ratio of the first solvent and the second solvent. In addition, the mixing ratio of the first solvent and the second solvent, the boiling point difference between the first solvent and the second solvent, etc., may change the application timing of the magnetic field in consideration of the drying temperature and the strength of the applied magnetic field, and can be appropriately adjusted through repeated experiments to observe the alignment and movement of the 1D composite. According to one exemplary embodiment, the mixing volume ratio of the first solvent and the second solvent may be 1:100 to 100:1, and the difference in the boiling point between the first solvent and the second solvent is about 50 to 200° C., specifically 50 to 150° C. The boiling point of the first solvent having a relatively high boiling point may be 150 to 350° C., and the drying temperature may be about 50 to the second boiling point *0.9° C., but is not limited thereto. However, the present invention does not exclude a single solvent. By controlling the intensity of the applied magnetic field or the application timing of the magnetic field even with a single solvent, the 1D composite structure is aligned (aligned in the application direction of the magnetic field) and the movement of the 1D composite may be prevented. In this case, the orientation direction of the 1D composite may be controlled by adjusting the application direction of the magnetic field. For example, by applying the magnetic field vertically to the coated film, the composite in which the 1D composite may be oriented in the membrane thickness direction may be prepared.

Until the 1D composite loses fluidity in the coated film being dried and is fixed, for example, until the drying is completed, the magnetic field may be continuously applied.

The fabrication method according to the exemplary embodiment may further include a synthesizing step of preparing the 1D composite before the coating step.

The synthesizing step may include a first step of forming an intermediate layer containing a cationic polymer in a 1D nanostructure; a second step of fixing magnetic nanoparticles to the surface of the intermediate layer by the electrostatic attraction in the liquid medium; and a third step of forming a surface layer containing an ion-conducting material on the 1D nanostructure in which the magnetic particles are fixed and the intermediate layer is formed.

More specifically, the synthesizing step may include a first step of forming an intermediate layer containing a cationic polymer in a 1D nanostructure using a first solution containing the 1D nanostructure having the negative zeta potential and the cationic polymer, a second step of fixing the magnetic nanoparticles to the surface of the intermediate layer by the electrostatic attraction using a second solution containing the 1D nanostructures with the intermediate layer and the magnetic nanoparticles having the negative zeta potential; and a third step of forming the surface layer containing the ion-conducting material using a third solution containing the 1D nanostructure in which the magnetic particles are fixed and the intermediate layer is formed and the ion-conducting material.

According to one exemplary embodiment, when the ion-conducting material for forming the surface layer is the cation-conducting material, it is possible to uniformly and stably cover the intermediate layer that electrostatically interacts with the intermediate layer to which the magnetic nanoparticles are not bonded by the ion exchange group having a negative charge such as a sulfonate group and is exposed to the outside the strong binding force.

According to one exemplary embodiment, the first step may include a step of applying ultrasonic waves to the first solution in which the 1D nanostructure is dispersed and the cationic polymer is dissolved; and a step of adding and stirring a metal salt to the first solution. By adding the metal salt to the first solution, the cationic component (a polymer having a positive charge) of the cationic polymer may enclose the 1D nanostructure more quickly and stably. In this case, the metal salt may cancel the electrostatic repulsion between the chains of the polymer to be coated so that a thicker and more uniform coating may be made. The metal salt is dissolved in the first solution, and it is sufficient to generate a metal ion as a cation and a counter ion as an anion. For example, the metal salt may be alkali metal or alkaline earth metal halide (e.g., chloride, etc.), but is not limited thereto.

The content of the 1D nanostructure and the protic polymer may be sufficient as long as the stable coating is made. For example, the first solution may contain 1D nanostructures at about 0.1 to 5.0 g/L, and the concentration of the protic polymer in the first solution may be about 0.1 to 5.0 wt %, but is not limited thereto. The solvent of the first solution is sufficient as long as it is a solvent in which the protic polymer is stably dissolved, like a polar solvent such as water. The amount of the metal salt added may also be sufficient as long as it promotes the coating of the cationic polymer. For example, the salt may be added so that the concentration of the metal salt in the first solution is 0.1 to 0.8 M, but is not limited thereto. In order to promote the protic polymer coating, the first solution may be heated to about 40 to 70° C. upon stirring, but the present invention may not be limited by heating or not or the specific heating temperature.

In one exemplary embodiment, the second step may be performed by dispersing the 1D nanostructure with the intermediate layer including the cationic polymer obtained through the first step and the magnetic nanoparticles in the liquid medium. At this time, the liquid medium may be a polar solvent such as water, and the pH of the liquid medium may be controlled to be basic in order to increase the electrostatic attraction between the magnetic nanoparticles and the intermediate layer by further lowering the negative zeta potential of the magnetic nanoparticles. At this time, the liquid medium may be controlled to be basic by a water-soluble base such as sodium hydroxide, and the pH of the liquid medium controlled to be basic may be 9.0 to 12.0, but it goes without saying that the present invention may not be limited by a specific basic material, specific pH of the second solution, and the like.

As described above, the cationic polymer having the positive charge in the intermediate layer and the magnetic nanoparticles having the negative zeta potential may be bonded to each other by the electrostatic attraction only by being mixed and dispersed in the liquid medium. The mass ratio of the 1D nanostructure with the intermediate layer:the magnetic nanoparticles in the second solution may be in the range of 1:0.01 to 0.2, but is not limited thereto. In addition, the conventional dispersion means such as ultrasonic waves may be used to disperse the 1D nanostructure with the intermediate layer and the magnetic nanoparticles, but is not limited thereto.

According to one exemplary embodiment, the third step may include a step of applying ultrasonic waves to a third solution in which the 1D nanostructure in which the 1D nanostructures obtained in the second step are attached to the intermediate layer is dispersed and the ion-conducting material is dissolved; and a step of adding and stirring a metal salt (second metal salt) to the third solution. Similar to the case of the first solution, by adding the metal salt to the third solution, the ion-conducting material, which is a polymer, can more uniformly and thickly cover the intermediate layer to form the surface layer. At this time, the metal salt (second metal salt) is sufficient as long as it is dissolved in the third solution independently of the metal salt (first metal salt) added to the first solution, and generates the metal ion as the cation and the counter ion as the anion. For example, the metal salt may be alkali metal or alkaline earth metal halide (e.g., chloride, etc.), but is not limited thereto.

The content of the 1D nanostructure (1D nanostructure in which the magnetic nanoparticles are attached to the intermediate layer) and the protic polymer in the third solution may be sufficient as long as the stable coating is performed. For example, the third solution may contain 1D nanostructures (1D nanostructures with the magnetic nanoparticles attached to the intermediate layer) at about 0.1 to 5.0 g/L, and the concentration of the ion-conducting material in the third solution may be about 0.1 to 5.0 wt %, but is not limited thereto. The solvent of the third solution is sufficient as long as it is a solvent in which the ion-conducting material is stably dissolved, like a polar solvent such as water. The amount of the metal salt added may also be sufficient as long as it promotes the coating of the ion-conducting material. For example, the salt may be added so that the concentration of the base in the third solution is 0.1 to 0.8 M, but is not limited thereto. In order to promote the coating of the ion-conducting material, the third solution may be heated to about 40 to 70° C. upon stirring, but the present invention may not be limited by heating or not or the specific heating temperature.

The dried film obtained in the drying step parallel to the application of the magnetic field may correspond to the ion-conducting composite described above. The fabrication method according to the exemplary embodiment may further include a step of activating the dried film obtained after the drying step, in which by this activating step, the ion exchange group region of the ion-conducting resin contained in the matrix and the ion-conducting material contained in the surface layer is hydrated, and a path through which ions are conducted may be formed. The activating step may correspond to the above-described method of activating the composite.

The present invention includes the ion-conducting layer fabricated by the above-described fabrication method.

The present invention includes the ion-conducting composite prepared through the method including the drying step in parallel with the application of the magnetic field before the activating step described above.

The present invention includes a device including the ion-conducting layer described above. The device may be any electrochemical device known to be equipped with the cation-conducting layer (cation exchange membrane, or cationic electrolyte membrane) or the anion-conducting layer (anion exchange membrane, or anion electrolyte membrane) as part of the device. Representative examples of such devices may include a fuel cell, a redox flow cell, an electrolysis device, a dialysis device, a water treatment device, an electrochemical double layer capacitor, or the like. The fuel cell may include a proton direct methanol fuel cell (DMFC), a polymer electrolyte fuel cell (PEMFC), a direct boron hydride fuel cell (DBFC), a solid alkaline fuel cell (SAFC), and the like. In the application of the fuel cell, the present invention includes a membrane electrode composite for a fuel cell including the ion-conducting layer described above. The electrolysis device may include an electrochemical or photo-electrochemical water decomposition device, and the dialysis device may include an electrodialysis process for desalting and purification, diffusion dialysis or electrodeionization, and the like. The water treatment device may be a Fenton oxidation device and the like, but is not limited thereto.

Hereinafter, $WS_2$ nanowires (minor axis diameter of 100 to 200 nm, major axis length of 1 to 2 μm) having a high aspect ratio, straightness due to rigid (rigid) physical properties, insulation, chemical stability in acidic or Fenton solutions, and negative zeta potential according to an advantageous example are used as the 1D nanostructures, iron oxide nanoparticles with a negative zeta potential are used as magnetic nanoparticles, and a fabrication example of the ion-conducting layer using Nafion, which is a representative ion-conducting resin of the cationic conductivity as an example, as a matrix material, and polystyrene sulfonate, which has better ion conductivity than the Nafion, as the material of the surface layer is provided, which is an example of using an appropriate nanowire in consideration of application in order to help a more general understanding of the present invention and the ion-conducting materials that satisfy the conditions according to an exemplary embodiment and are most commonly used, and it goes without saying that the present invention may not be limited to the materials used in the preparation example.

PREPARATION EXAMPLE

Preparation of 1D Composite

Tungsten disulfide ($WS_2$) nanowires were ultrasonically dispersed in 1 wt % of polydiallyldimethylammonium chloride (PDDA, Mw=200000-3500000, Sigma-Aldrich) aqueous solution for 1 hour to prepare a first solution having a concentration of 1 g/L. Then, NaCl (Sigma Aldrich) was added to the first solution to a concentration of 0.5 M, and stirred at 50° C. for 12 hours to form the intermediate layer in the nanowire. The fabricated nanowires with the intermediate layer were washed three times with deionized water and dried at 50° C.

The nanowires with the intermediate layer and $Fe_3O_4$ nanoparticles (10 to 20 nm) were dispersed in a NaOH aqueous solution of pH 11 for 3 hours and were fixed for 12 hours to fabricate the nanowires with the fixed nanoparticles. The weight ratio of the nanowire with the intermediate layer:$Fe_3O_4$ nanoparticles which are input to the aqueous solution of pH 11 was 10:1. As the fabricated nanowires have magnetism by magnetic nanoparticles, the nanowires were collected using a magnet, and washed three times using a magnet and deionized water.

The nanowires with magnetic nanoparticles fixed thereto were ultrasonically dispersed in 1 wt % of polystyrene sulfonate (PSS, Mw=70,000, sulfonate group=5.68 meq/g) aqueous solution for 1 hour to prepare a third solution with a concentration of 1 g/L. Then, NaCl (Sigma Aldrich) was added to the third solution to a concentration of 0.5 M, and stirred at 50° C. for 12 hours to form the surface layer on the nanowire. The nanowires with the surface layer were washed three times with deionized water and dried at 50° C.

Transmission electron microscopy (TEM, Talos F200X, FEI) analysis was performed to confirm $Fe_3O_4$ attached to the surface of the $WS_2$ nanowire. The $WS_2$ nanowire without any treatment and the $WS_2$ nanowire to which $Fe_3O_4$ was attached were completely dispersed in a TEM grid (Lacey carbon, Cu-200) and measured by a pipette. At the same time, X-ray energy dispersion spectroscopy (EDS) was performed to perform elemental analysis with a silicon drift detector (SDD). The surface charges measured using a zeta potential meter (Zetasizer Nano ZS 90, Malvern, 25° C. and air condition), and all samples were dispersed in deionized water well by applying ultrasonic waves thereto with a concentration of 1 g/L. The content of the $WS_2$ nanowire enclosed with a polymer was analyzed using thermogravimetric analysis (TGA, TG209 F1 Libra, NETZSCH), and X-ray photoelectron spectroscopy (XPS, Al K-alpha, Thermo VG Scientific) was performed on the surface characteristics of the $WS_2$ nanowire.

Figure 2:
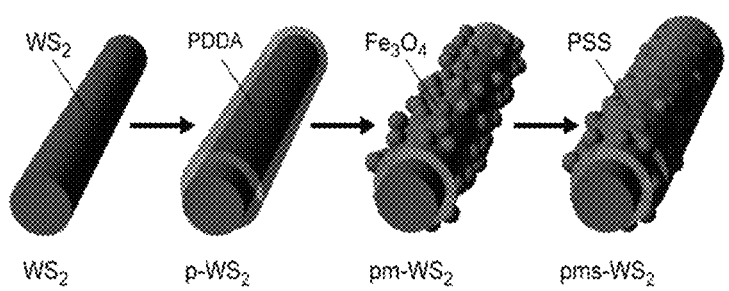
FIG. 2 is a schematic diagram illustrating a bare $WS_2$ nanowire ($WS_2$), a nanowire (p-$WS_2$) with an intermediate layer, a nanowire (pm-$WS_2$) with magnetic nanoparticles attached to the intermediate layer, and a nanowire (pms-$WS_2$) with a surface layer, respectively.

FIG. 2 is a schematic diagram illustrating a bare $WS_2$ nanowire ($WS_2$), a nanowire (p-$WS_2$) with an intermediate layer, a nanowire (pm-$WS_2$) with magnetic nanoparticles attached to the intermediate layer, and a nanowire (pms-$WS_2$) with a surface layer, respectively.

Figure 3:
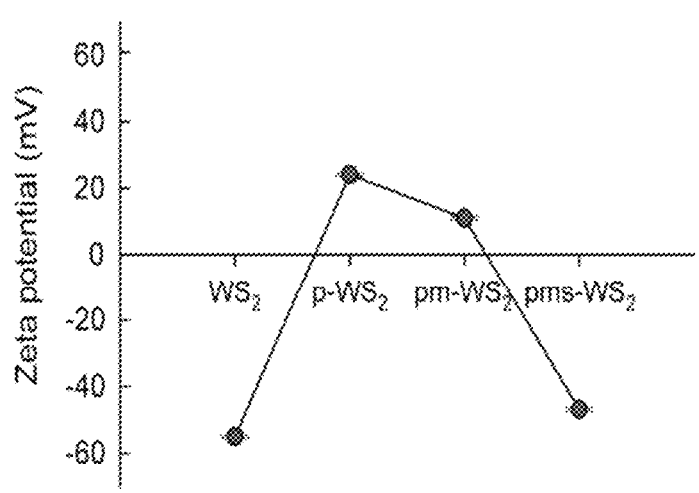
FIG. 3 is a diagram illustrating measurement of zeta potentials of each of $WS_2$, p-$WS_2$, pm-$WS_2$, and pms-$WS_2$ using deionized water as a dispersion medium.

FIG. 3 is a diagram illustrating measurement of zeta potentials of each of $WS_2$, p-$WS_2$, pm-$WS_2$, and pms-$WS_2$ using deionized water as a dispersion medium. It can be seen from FIG. 3 that the cationic polymer was coated on the nanowire with the negative zeta potential, and the zeta potential was changed to a positive value, and that the oxide-based magnetic nanoparticles with the negative zeta potential were attached, the zeta potential was reduced, the PSS, which is the cation-conducting material, covered the surface of the layer (intermediate layer) coated with the cationic polymer, and finally shows a negative zeta potential.

Figures 4A, 4B:
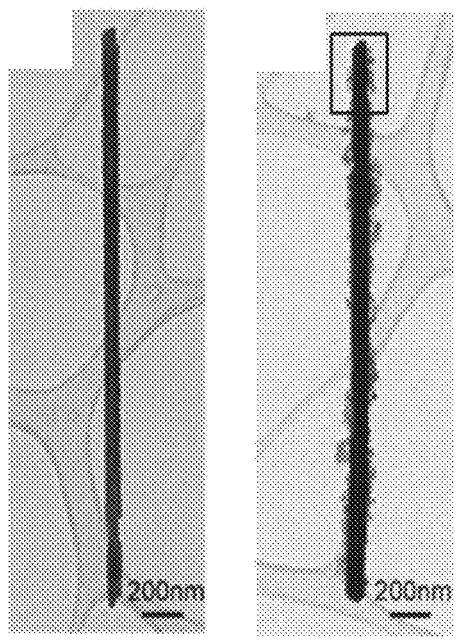
FIGS. 4A and 4B are transmission electron microscope photographs of bare $WS_2$ nanowires (FIG. 4A, $WS_2$) and nanowire (FIG. 4B, pm-$WS_2$) with magnetic nanoparticles attached to the intermediate layer.

FIGS. 4A and 4B are transmission electron microscope photographs of bare $WS_2$ nanowires (FIG. 4A, $WS_2$) and nanowire (FIG. 4B, pm-$WS_2$) with magnetic nanoparticles attached to the intermediate layer. It can be seen from FIGS. 4A and 4B that PDDA as the cationic polymer and the oxide-based magnetic nanoparticles were successfully bound by the electrostatic attraction, so the magnetic nanoparticles having a size of 10-20 nm were uniformly distributed on the p-$WS_2$ surface.

Figures 5A, 5B:
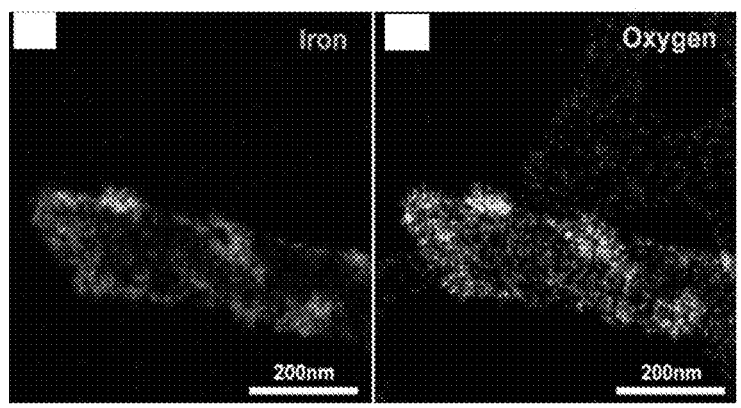

FIGS. 5A and 5B are diagrams each illustrating an STEM-EDS mapping image of a region indicated by a square in pm-$WS_2$ of FIG. 4B, in which FIG. 5A illustrates a Fe mapping image and FIG. 5B illustrates an oxygen mapping image. It can be seen from FIGS. 5A and 5B that the iron oxide nanoparticles are very uniformly bound and distributed on the surface of the nanowires due to the electrostatic attraction between the intermediate layer and the nanoparticles.

Figures 6A, 6B:
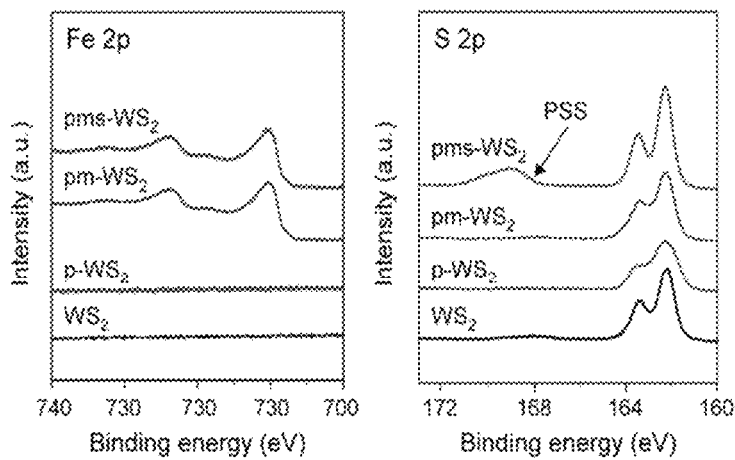
FIGS. 6A and 6B are diagrams illustrating measurement of X-ray photoelectron spectroscopy (XPS) spectra of $WS_2$, p-$WS_2$, pm-$WS_2$, and pms-$WS_2$, respectively, and illustrating Fe 2p spectrum and S 2p spectrum.

FIGS. 6A-6B are diagrams illustrating measurement of X-ray photoelectron spectroscopy (XPS) spectra of $WS_2$, p-$WS_2$, pm-$WS_2$, and pms-$WS_2$, respectively, and illustrating Fe 2p spectrum and S 2p spectrum. As can be seen from FIGS. 6A and 6B, the Fe 2p peak of $Fe_3O_4$ appears in pm-$WS_2$ and pms-$WS_2$, and is a result proving that $Fe_3O_4$ is well coated on the surface. In addition, the S 2p peak (169.5 eV) due to the sulfonate group of PSS is observed only in the pms-$WS_2$, and it can be seen that the PSS surface layer is formed by the observation. In addition, by confirming that the pms-$WS_2$ moves through the magnet in the water dispersion, it was confirmed that the magnetic properties were well imparted to the pms-$WS_2$.

Preparation of Ion-Conducting Composite

Nafion powder was prepared by mixing 5 wt % of Nafion dispersion (D520, Dupont, Nafion sulfonate group=0.90 meq/g) and deionized water and drying the mixture by a spray dryer (Buchi, B-290). The obtained Nafion powder was dispersed in dipropylene glycol (DPG) at 10 wt % for 24 hours by a roll milling method to prepare a suspension, and then the pms-$WS_2$ was added to this suspension and dispersed for 1 hour using tip-ultrasonic dispersion, thereby uniformly preparing the mixed solution. Thereafter, the mixed solution was cast on a glass plate using a doctor blade to form a coated film, and a magnetic field was applied to the coated film at 300 G and dried at 60° C. At this time, the nanowires (pms-$WS_2$) were mixed so that the content of the nanowires was 2 wt %, 5 wt %, or 0.5 wt % in the dried coated film (composite membrane). The thickness of the finally dried coated film (composite membrane) was 40 •m. In addition, the magnetic field started to be applied at 2 hours after the start of drying, which is a point in time when the viscosity of the coating film increases and the nanowires can rotate but can be prevented from directional movement, and the magnetic field was continuously applied until the drying was completed. At this time, the total drying time was 24 hours.

Preparation of Ion-Conducting Layer

The prepared composite membrane was immersed in an aqueous sulfuric acid solution of a concentration of 2 M for 12 hours to perform activation (hydration & protonation) treatment. After that, the activated film was washed with deionized water to remove the remaining protons and other impurities. After activation, an analysis result of using TEM/EDS, UV-vis, and ICP-MS confirmed that all magnetic nanoparticles were removed upon activation.

When fabricating the composite membrane, the magnetic field was applied to be parallel to the film (indicated by IP⁻ in the prepared samples and drawings) or perpendicular to the film (indicated by TP⁻ in the prepared samples and drawings), and for comparison, a composite membrane was prepared by injecting pms-$WS_2$ in the same manner for comparison. In addition, the composite membrane and the ion-conducting layer of the comparative group were prepared in the same manner by not applying a magnetic field and inputting a nanowire at all (Nafion membrane), or p-$WS_2$ and pm-$WS_2$ instead of pms-$WS_2$. Hereinafter, in the prepared sample, the state before activation is referred to as a membrane or a composite membrane, and the activated state is referred to as an ion-conducting layer (or ion-conducting layer).

Preparation of Catalyst Layer for Fuel Cell and Membrane Electrode Assembly

Aquivion 16 ionomer dispersion (25 wt % Aquivion in water, D72-25BS, Sigma-Aldrich) with Pt—C catalyst (46.2 wt % Pt, TEC10E50E, Tanaka Kikinzoku Kogyo) and dipropylene glycol (DPG) were mixed by planetary ball milling for 3 hours. The mass ratio of the ionomer and the Pt—C catalyst was 1:2. The mixed slurry was cast on a polyimide film flatly attached to a glass plate with a doctor blade, and dried in an oven at 60° C. for 24 hours to prepare a catalyst layer. The catalyst layers were attached to both sides of the ion-conducting layer to prepare the membrane electrode assembly (MEA). The active area of the MEA was 25 cm², the ion-conducting layer and the catalyst layer were pressed at 20 atm and was pressurized at 135° C. for 3 minutes. Thereafter, the polyimite film was removed from the MEA. The Pt loading amount of the anode and cathode catalyst layers was 0.2±0.01 mg/cm².

Scanning electron microscopy and optical (BX51, Olympus) analysis were performed to observe the nanowires aligned on the Nafion membrane. A sample observed with a scanning electron microscope was prepared by freezing with liquid nitrogen and vacuum sputtering Pt on the surface. To confirm the alignment of the nanowires in the membrane, the magnetic properties of the membrane were measured using a vibrating sample magnetometer (VSM, MPMS3-Evercool, Quantum Design). All samples were placed perpendicular to the magnetic field and susceptibility was calculated. The properties of the membrane were measured in the range of 400-4000 $cm^{-1}$ using attenuated total reflection-Fourier transform infrared spectroscopy (ATR-FTIR, Thermo Fisher Scientific Instrument, Nicolet iS50). Before the measurement, to determine the domain size of the membrane, X-ray small angular scattering (SAXS, NANOPIX, RIGAKU) analysis was performed in the range of 0 to 0.32°. All samples were hydrated with non-ionized water and sealed with a Kapton tape so as not to interfere with the measurement. X-rays were transmitted in the membrane thickness direction.

To measure proton conductivity, the activated composite membrane (ion exchange membrane) was cut into 1 cm·4 cm, placed in a horizontal conductivity cell (MCC, Won-A Tech), and assembled into a fuel cell frame. Thereafter, the fuel cell frame was connected to the test station, and the horizontal conductivity was measured under nitrogen atmosphere, 80° C., and various humidity conditions. The horizontal conductivity was measured by alternating current impedance analysis (HCP-803, BioLogic Science Instrument) of a 2-probe method. The amplitude of the alternating current was 10 mV and the frequency was 1 MHz to 0.1 Hz. The conductivity value (σ) of the membrane was calculated by Equation σ=1/(R·A). In the equation, 1, R, and A correspond to a distance between the electrodes, an ohmic resistance, and an area of the ion-conducting layer, respectively.

For the fuel cell testing and the electrochemical analysis of the MEA with the fabricated ion-conducting layer, the MEA was assembled into a pair of graphite blocks that has a pair of gas diffusion media (JNT 20A3, JNTG), a pair of gaskets, and a single serpentine flow field. The assembled single cell was applied with a load of 8 volt and a torque of 80 kgf·cm. The polarization curve of the single cell was measured using a fuel cell test station (CNL), and the measurements were performed at relative humidity conditions of 30%, 50%, 80%, and 100% and at a temperature of 80° C. without back-pressure. Hydrogen gas and air were allowed to flow into the anode and cathode, and the flow rates of hydrogen gas and air were 500 and 1400 sccm, respectively. Electrochemical impedance spectroscopy (ESI) was performed using an alternating current impedance analyzer (HCP-803, BioLogic Science Instrument) to evaluate the ohmic resistance of a single cell. In the ESI analysis, the amplitude ranged from 10 mV and the frequency ranged from 0.45 V to 100 kHz-100 mHz. In addition, to check the hydrogen gas crossover and short-circuit, a linear sweep voltammetry was performed in a hydrogen/nitrogen atmosphere in the range of 0.07-0.7 V, and the scan speed was 1 $mVs^{-1}$.

As a result of observing the prepared composite membranes using an optical microscope, in the case of the p-$WS_2$/Nafion membrane or the pm $WS_2$/Nafion membrane, it was confirmed that nanowires were not uniformly distributed and aggregated in the Nafion matrix due to poor compatibility. On the other hand, in the case of the pms-$WS_2$/Nafion membrane, it was confirmed that the separation of the nanowires did not occur, and a transparent film in which the nanowires were uniformly dispersed was prepared. This can be interpreted as a result of having very high miscibility (affinity) with each other as the surface layers of the matrix and the nanowire are materials that conduct the same kind of ions.

Figure 7A:
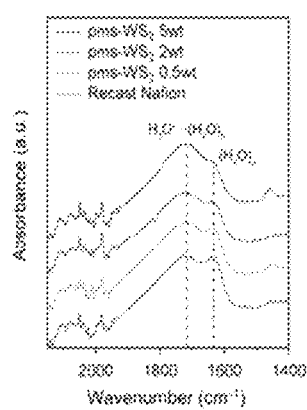
Figure 7B:
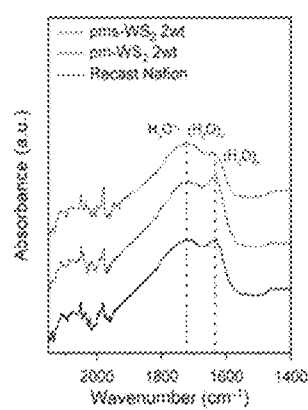

To confirm the proton addition, the activated pms-$WS_2$/Nafion membrane was observed using attenuated total reflection-Fourier transform infrared spectroscopy (ATR-FTIR). FIGS. 7A and 7B are diagrams illustrating the measurement of the FTIR spectrum of the prepared membrane. FIG. 7A illustrates FTIR spectra of a Nafion membrane (Recast Nafion) to which nanowires are not added, 0.5 wt % of pms-$WS_2$/Nafion membrane, 2 wt % of pms-$WS_2$/Nafion membrane, and 5 wt % of pms-$WS_2$/Nafion membrane, respectively, and FIG. 7B illustrates FTIR spectra of 2 wt % of pms-$WS_2$/Nafion membrane and each 2 wt % of pm-$WS_2$/Nafion membrane which is a Nafion membrane containing 2 wt % of pms-$WS_2$/Nafion membrane by mixing pm-$WS_2$ instead of pms-$WS_2$ in Preparation Example, respectively.

It can be seen from FIG. 7A that each fabricated membrane, the spectrum exhibits a significant difference in the range of 1400 to 2100 $cm^{-1}$. Two peaks centered at 1740 $cm^{-1}$ and 1630 $cm^{-1}$ correspond to a bending mode of hydrated proton $\delta[(H_3O^+ \cdot (H_2O)_n])$ and a bending mode of bulk water $\delta[(H_2O)_n]$, respectively. It can be seen that as the amount of pms-$WS_2$ increases, the intensity of 1740 $cm^{-1}$ peak relative to the 1630 $cm^{-1}$ peak increases. This means that the more pms-$WS_2$ contains, the higher the concentration of protons in the water cluster, because of the $SO_3^{-1}$ ion exchange group (ion exchange group due to PSS) locally concentrated on the $WS_2$ surface. In the same range, the FTIR spectrum between the pm-$WS_2$/Nafion membrane and the Nafion membrane was not significantly different, and it can be seen that the increase in peak intensity of 1740 cm$^{-1}$ is due to PSS.

Figures 8A, 8B, 8C, 8D, 8E:
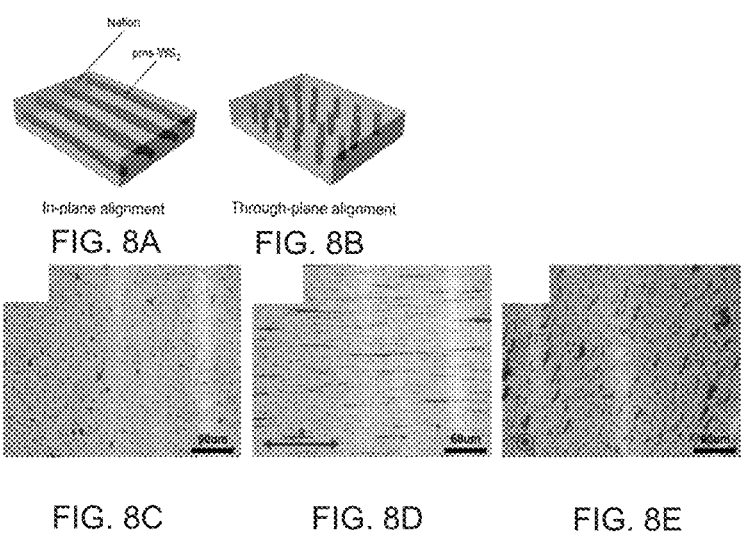
FIGS. 8A-8B are schematic diagrams illustrating structures of IP-pms-$WS_2$/Nafion membrane and TP-pms-$WS_2$/Nafion membrane, respectively.
FIGS. 8C, 8D, and 8E each are optical pictures of observation of U-pms-$WS_2$/Nafion membrane, IP-pms-$WS_2$/Nafion membrane, and TP-pms-$WS_2$/Nafion membrane.
Figures 9A, 9B:
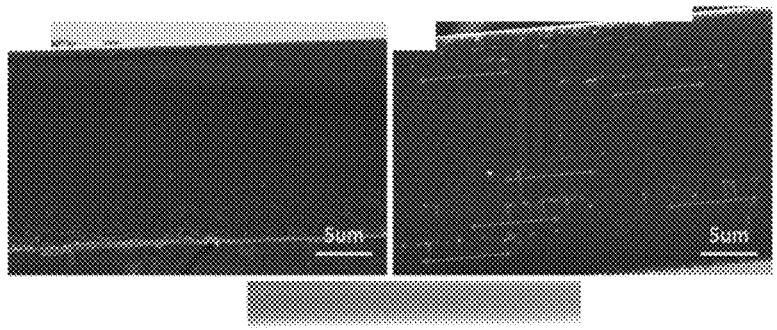
FIGS. 9A-9C are scanning electron microscope photographs of observation of a U-pms-$WS_2$/Nafion membrane (FIG. 9A), IP-pms-$WS_2$/Nafion membrane (FIG. 9B), and TP-pms-$WS_2$/Nafion membrane (FIG. 9C).
Figure 9C:
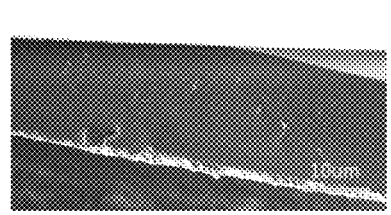

FIG. 8A is a schematic diagram illustrating a structure of IP-pms-WS$_2$/Nafion membrane and TP-pms-WS$_2$/Nafion membrane, and FIGS. 8B, 8C, and 8D each are optical pictures of observation of U-pms-WS$_2$/Nafion membrane, IP-pms-WS$_2$/Nafion membrane, and TP-pms-WS$_2$/Nafion membrane. In this case, the application direction of the magnetic field in FIGS. 8D-8E is shown in purple B. FIGS. 9A-9C are scanning electron microscope photographs of observation of a U-pms-WS$_2$/Nafion membrane (FIG. 9A), IP-pms-WS$_2$/Nafion membrane (FIG. 9B), and TP-pms-WS$_2$/Nafion membrane (FIG. 9C).

It can be seen from the observation results of FIGS. 8A-8E and 9A-9C that when a magnetic field is not applied, the pms-WS$_2$ nanowires are randomly embedded in the form of micro-sized bundles. However, when a magnetic field is applied during the drying process, it can be seen that the pms-WS$_2$ nanowires form a structure aligned along the magnetic field direction. It can be seen that each of the aligned pms-WS$_2$ bundles was significantly smaller than 10 μm, and are uniformly distributed in the Nafion membrane.

Figure 10:
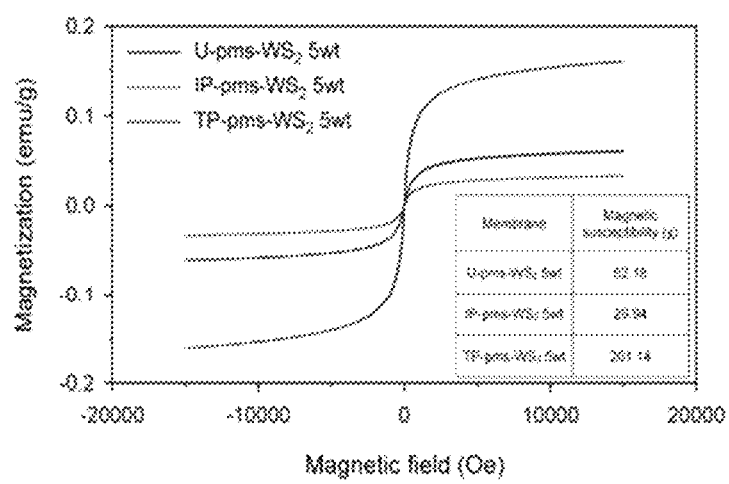
FIG. 10 is a diagram illustrating magnetization curves of 5 wt % of U-pms-$WS_2$/Nafion membrane, 5 wt % of IP-pms-$WS_2$/Nafion membrane, and 5 wt % of TP-pms-$WS_2$/Nafion membrane, respectively, which are measured using a vibrating sample magnetometer (VSM).

FIG. 10 is a diagram illustrating magnetization curves of 5 wt % of U-pms-WS$_2$/Nafion membrane, 5 wt % of IP-pms-WS$_2$/Nafion membrane, and 5 wt % of TP-pms-WS$_2$/Nafion membrane, respectively, which are measured using a vibrating sample magnetometer (VSM).

It can be seen from FIG. 10 that the degree of magnetization varies depending on the orientation of pms-NW in the Nafion membrane, and when the direction of the magnetic field (VSM magnetic field applied to the membrane thickness direction) and the alignment direction of the nanowires are the same, the magnetization becomes stronger. Compared to the non-aligned U-pms-WS$_2$/Nafion membrane, the TP-pms-WS$_2$/Nafion membrane aligned in the thickness direction showed strong magnetization, and the IP-pms-WS$_2$/Nafion membrane in the horizontal direction showed weaker magnetization to the change in the external magnetic field. In other words, as the TP-pms-WS$_2$/Nafion membrane in the thickness direction is parallel to the direction of the magnetic field, and the IP-pms-WS$_2$/Nafion membrane in the horizontal direction is perpendicular to the direction of the magnetic field, it can be seen that the susceptibility is TP-pms-WS$_2$/Nafion membrane, U-pms-WS$_2$/Nafion membrane, and IP-pms-WS$_2$/Nafion membrane in order. The susceptibility was calculated by VSM measurement, and the susceptibilities of the TP-pms-WS$_2$/Nafion membrane, the U-pms-WS$_2$/Nafion membrane, and the IP-pms-WS$_2$/Nafion membrane were 201.14, 62.18, and 29.94, respectively.

Although not necessarily limited to this interpretation, in the ion-conducting layer, the effect of nanowires related to the ion conductivity may be divided into two parts. One is the "additive effect" that appears depending on the content of the functionalized nanowires, and the other is the "alignment effect" that facilitates the movement of ions in the alignment direction when the proton movement channels of the nanowires are aligned. In other words, the proton movement channel, which is abundant on the surface of the nanowire, provides a less complex proton movement path, and also allows the movement of the directional proton ion.

Figure 11A:
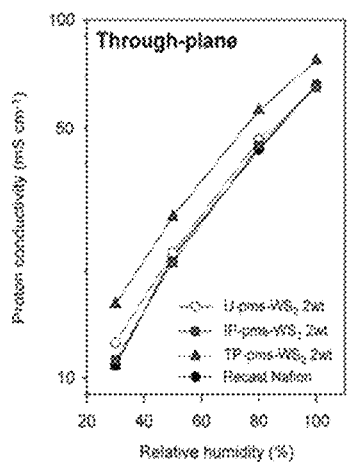
FIGS. 11A-11D are diagrams illustrating measurement of proton conductivity in in-plane and in-plane vertical directions of the ion-conducting layer, which is an activated composite membrane.
Figure 11B:
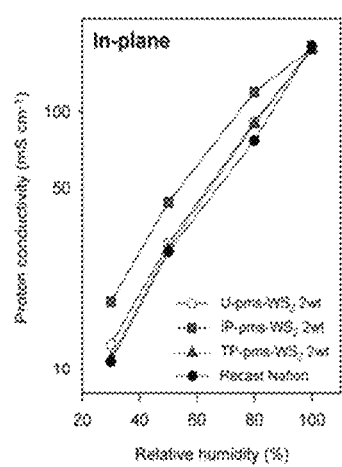
Figure 11C:
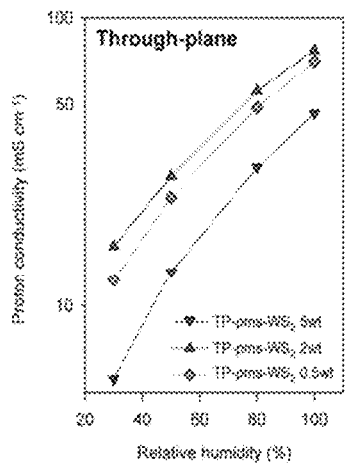
Figure 11D:
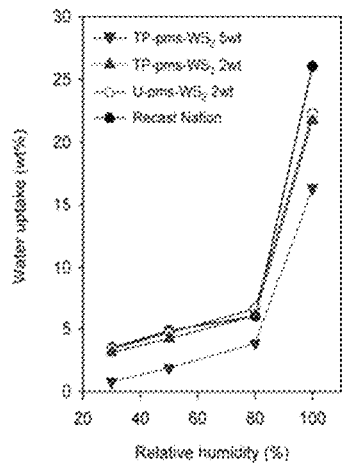

FIGS. 11A-11D are diagrams illustrating the measurement of the proton conductivity of the ion-conducting layer, which is the activated composite membrane, and FIGS. 11A and 11B are diagrams illustrating the measurement of ion conductivities of protons according to relative humidities of 2 wt % of U-pms-WS$_2$/Nafion ion-conducting layer (shown as a circle), 2 wt % of IP-pms-WS$_2$/Nafion ion-conducting layer (shown in a square), 2 wt % of TP-pms-WS$_2$/Nafion ion-conducting layer (shown in a triangle), and a Nafion membrane (Recast Nafion, shown in a circle filled in black) prepared in the same manner as in Preparation Example as Nafion suspension without adding nanowires, FIG. 11A is a diagram illustrating measurement of proton ion conductivity in a membrane thickness direction (though-plane), and FIG. 11B is a diagram illustrating the measurement of the proton ion conductivity in the in-plane direction of the membrane. FIG. 11C is a diagram illustrating the measurement of proton ion conductivities in a through-plane direction according to relative humidities of 0.5 wt % of TP-pms-WS$_2$/Nafion ion-conducting layer (shown in a diamond), 2 wt % of TP-pms-WS$_2$/Nafion ion-conducting layer (shown in a triangle), and 5 wt % of TP-pms-WS$_2$/Nafion ion-conducting layer (shown in an inverse triangle), respectively. FIG. 11D is a diagram illustrating the measurement of moisture contents (wt %) according to relative humidities of 2 wt % of U-pms-WS$_2$/Nafion ion-conducting layer (shown in a circle), 2 wt % of TP-pms-WS$_2$/Nafion ion-conducting layer (shown in a triangle), 5 wt % of TP-pms-WS$_2$/Nafion ion-conducting layer (shown in an inverse triangle), and a Nafion membrane (Recast Nafion, shown in a circle filled in black) prepared in the same manner as in Preparation Example with the Nafion suspension without adding nanowires, respectively.

It can be seen from FIGS. 11A-11D that the proton conductivity increases to 2 wt % of pms-WS$_2$, but the proton conductivity decreases as the content of pms-WS$_2$ increases to 5 wt %. It can be interpreted that the proton conductivity increases to 2 wt % of pms-WS$_2$ due to the addition effect, but when the content of pms-WS$_2$ is excessive, the ionomer material in the ion-conducting layer decreases and the proton conductivity decreases.

The proton conductivity in the thickness direction is practically important because it is directly connected to the ohmic resistance of the electrochemical cell. As a result of comparing the proton conductivities in the vertical direction of 2 wt % of U-pms-WS$_2$/Nafion ion-conducting layer, 2 wt % of IP-pms-WS$_2$/Nafion ion-conducting layer, and 2 wt % of TP-pms-WS$_2$/Nafion ion-conducting layer and the Nafion membrane of FIG. 11A, membranes (–TP) aligned in the thickness direction showed the highest conductivity in a thickness direction regardless of the relative humidity, which proves that the proton movement path coincides with the thickness direction. The proton conductivity in the membrane thickness directions (–IP) aligned in a horizontal direction was lower than that of the Nafion membrane. Similarly, it can be seen that the nanowires aligned horizontally in the proton transfer direction (vertical direction) have an effect of preventing movement. Based on the conductivity in the thickness direction, the proton conductivity of the membrane (–TP) aligned in the thickness direction at a relative humidity of 40% was 70% higher than that of the recast Nafion membrane. Thus, it can be seen that by aligning the proton conduction channels in the thickness direction, it can effectively operate as a proton exchange membrane even at low humidity.

In addition, as a result of comparing the proton conductivities in the horizontal direction of 2 wt % of U-pms-WS$_2$/Nafion ion-conducting layer, 2 wt % of IP-pms-WS$_2$/Nafion ion-conducting layer, and 2 wt % of TP-pms-WS$_2$/Nafion ion-conducting layer and the Nafion membrane of FIG. 11B, the (IP-) membrane aligned in a horizontal direction showed higher conductivity compared to the non-aligned membrane under all humidity conditions, which is due to the alignment effect. In addition, the proton conductivity of the ion-conducting layer aligned in the thickness direction (TP-) was lower than that of the non-aligned membrane, which means that the nanowire perpendicular to the proton transfer direction interferes with the movement of protons through the Nafion membrane. The conductivity in the in-plane direction of the IP-pms-WS$_2$/Nafion ion-conducting layer was 46.6% higher than that of the Nafion membrane at a relative humidity of 30%.

Figure 12A:
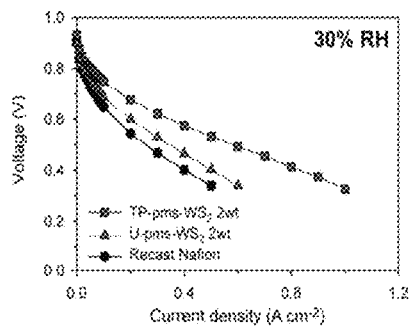
FIGS. 12A-12D are diagrams illustrating measurement of voltage-current density according to relative humidity as a result of testing performance of a membrane electrode assembly (MEA) with an ion-conducting layer in which nanowires are aligned in a thickness direction.
Figure 12B:
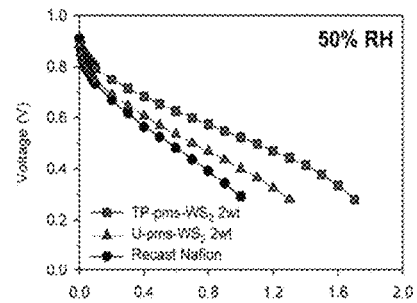
Figure 12C:
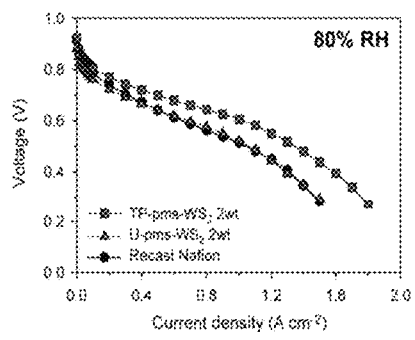
Figure 12D:
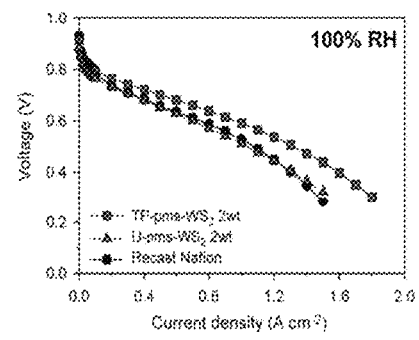

FIGS. 12A-12D illustrate a result of testing the performance of the membrane electrode assembly (MEA) with the ion-conducting layer in which nanowires are aligned in the thickness direction, and illustrates a voltage-current curve (shown in a square in the drawing) measured at 80° C. by changing the relative humidity to 30% (FIG. 12A), 50% (FIG. 12B), 80% (FIG. 12C), and 100% (FIG. 12D). For comparison, the results of the MEA made of the ion-conducting layer (U-pms-WS$_2$/Nafion ion-conducting layer, shown in a triangle) and a Nafion membrane (Recast Nafion, shown in a circle) without applying a magnetic field during the drying are also shown, and the power performance gain was numerically compared by the alignment effect and the addition effect. The overall power performance is undoubtedly determined by the proton conductivity. Regardless of the relative humidity, the membrane (TP-) aligned in the thickness direction showed much higher performance than the non-aligned membrane (U-) and the Nafion membrane. The power performance gain becomes larger as the relative humidity decreases, and it can be seen that the high-speed movement path of, especially, well-connected and aligned protons is important at low relative humidity. The power density of the membrane (-TP) aligned in the thickness direction at 0.4 V was 336 mW/cm$^2$, which was 110% higher than the Nafion membrane of 160.4 mW/cm$^2$, and 67.1% higher than the non-aligned membrane (U-) of 201.5 mW/cm$^2$.

The difference between the non-aligned membrane (U-) and the Nafion membrane may be interpreted as due to the addition effect. At a low humidity of 30 to 50%, the addition of nanowires with the ion conduction path slightly increases the power performance, but at high relative humidity of 80-100%, the power performance is almost the same. In other words, the existence of a proton conduction channel (channel provided by nanowires) with better conductivity is effective at low relative humidity, but it may be interpreted that the effect is not so great because conduction is well carried out by the Nafion matrix at high relative humidity.

Conversely, the alignment effect appears well in all the relative humidity ranges, and a design such as a high-speed proton path aligned in the thickness direction is a universal strategy that may improve power performance in all the relative humidity ranges. As an experimental result of observing the proton conductivity, the optimum content of pms-WS$_2$, which showed the maximum ion conductivity, was 2 wt %, which is consistent with the power performance result.

According to the present invention, the ion-conducting layer includes an ion conductive matrix and a surface layer having ion-conducting ability for conducting homogeneous ions, but includes a 1D dispersion phase oriented in the membrane thickness direction, so the ion-conducting layer can have the ion conductivity significantly improved in the membrane thickness direction.

Hereinabove, although the present invention has been described by specific matters such as detailed components, Exemplary embodiments, and the accompanying drawings, they have been provided only for assisting in the entire understanding of the present invention. Therefore, the present invention is not limited to the Exemplary embodiments. Various modifications and changes may be made by those skilled in the art to which the present invention pertains from this description.

Therefore, the spirit of the present invention should not be limited to these Exemplary embodiments, but the claims and all of modifications equal or equivalent to the claims are intended to fall within the scope and spirit of the present invention.

What is claimed is:

1. An ion-conducting layer, comprising:
an ion conductive matrix; and
a 1D composite dispersed in the ion conductive matrix and oriented in the thickness direction of the ion-conducting layer,
wherein the 1D composite provides an ion-conduction path having a straight 1D structure,
wherein the 1D composite includes:
a core of a non-conductive 1D nanostructure;
an intermediate layer enclosing the core and having magnetic nanoparticles bonded to a surface thereof; and
a surface layer conducting the same kind of ions as ions in the matrix, and
wherein the ion-conducting layer is cationic-conducting.

2. The ion-conducting layer of claim 1, wherein the intermediate layer includes cationic polymer.

3. The ion-conducting layer of claim 2, wherein the magnetic nanoparticles have a negative zeta potential, and the magnetic nanoparticles are fixed and bonded to the intermediate layer by an electrostatic attraction.

4. The ion-conducting layer of claim 2, wherein the 1D nanostructure has a negative zeta potential, and each of the 1D nanostructure and the intermediate layer, and the intermediate layer and the surface layer are bonded to each other through ionic interaction.

5. The ion-conducting layer of claim 1, wherein the 1D nanostructure is selected from one or more nanowires, nanotubes, and nanorods.

6. The ion-conducting layer of claim 1, wherein a thickness of the surface layer is 1 to 100 nm.

7. The ion-conducting layer of claim 2, wherein the matrix or the surface layer contains a sulfonated block copolymer, a perfluorinated polymer having a sulfonate group on a side chain, or a sulfonated aromatic polymer.

8. The ion-conducting layer of claim 2, wherein the ion conductivity of the surface layer is greater than that of the matrix.

9. The ion-conducting layer of claim 2, wherein the cationic polymer is one or more selected from poly(allylamine hydrochloride), poly(diallyldimethylammonium chloride), poly(acrylamide Co-diallyldimethylammonium chloride), polyethyleneimine, polymethacryloxyethyltrialkylammonium halide, polyarylaminechloride, polyacrylamide, aminoethylated polyacrylamide, polyvinylamine, and polyethyleneamine.

10. The ion-conducting layer of claim 2, wherein the surface layer is a porous membrane having a through type pore.

11. The ion-conducting layer of claim 1, wherein the magnetic nanoparticles are ferromagnetic nanoparticles.

12. An ion-conducting layer, comprising:
an ion conductive matrix; and
a 1D dispersion phase dispersed in the ion conductive matrix and oriented in the thickness direction of the ion-conducting layer, wherein the 1D dispersion phase provides an ion-conduction path having a straight 1D structure,
wherein the 1D dispersion phase includes:
  a core of a non-conductive 1D nanostructure; and
  a surface layer conducting the same kind of ions as ions in the matrix, and wherein the ion-conducting layer is cationic-conducting.

* * * * *